United States Patent
Katz

(10) Patent No.: US 6,310,398 B1
(45) Date of Patent: Oct. 30, 2001

(54) ROUTABLE HIGH-DENSITY INTERFACES FOR INTEGRATED CIRCUIT DEVICES

(75) Inventor: Walter M. Katz, 2901 N. Lakeridge Trail, Boulder, CO (US) 80302

(73) Assignee: Walter M. Katz, Boulder, CO (US)

(*) Notice: Subject to any disclaimer, the term of this patent is extended or adjusted under 35 U.S.C. 154(b) by 0 days.

(21) Appl. No.: 09/439,556

(22) Filed: Nov. 12, 1999

Related U.S. Application Data

(60) Provisional application No. 60/110,762, filed on Dec. 3, 1998.

(51) Int. Cl.[7] .......................... H01L 23/48; H01L 23/52; H01L 23/40
(52) U.S. Cl. .................. 257/773; 257/774; 257/786; 257/792; 257/698; 257/690; 257/737; 257/738; 257/780; 361/772
(58) Field of Search .................................. 257/773, 774, 257/786, 692, 698, 780, 737, 738; 361/772

(56) References Cited

U.S. PATENT DOCUMENTS

| | | | |
|---|---|---|---|
| 3,795,845 | 3/1974 | Cass et al. | 317/234 |
| 4,095,866 | 6/1978 | Merrill | 339/17 E |

(List continued on next page.)

OTHER PUBLICATIONS

Trobough, D. (1998) "IC Density Drives Array Packages" *ISD* Aug. 1998:46–50.

*Primary Examiner*—Steven Loke
*Assistant Examiner*—Nitin Parekh
(74) *Attorney, Agent, or Firm*—Greenlee, Winner & Sullivan, P.C.

(57) ABSTRACT

Patterns for a routable interface of the signal lines of a integrated circuit device include several groups of terminals distributed about the pattern center, each group clustered along a corresponding curvilinear reference segment extending outward from the pattern center to its perimeter. Routability zones are created between each successive pair of groups. For higher terminal density, in at least one of the terminal groups of the pattern, either the offset of the terminals from the reference line segment is not uniform, or the distance of the terminals from the pattern center does not increase uniformly. A portion, preferably at least about 50% of the terminals in a group of the pattern are not collinear with, but offset from, the reference segment. A portion, preferably at least about 90% of the terminals in a given terminal group are each closer to the reference line segment of that terminal group than they are to the reference segment of another terminal group. The patterns of this invention can be employed on IC chips, IC package layers and PCB layers for patterning of terminals, pins, via, pads and another connector devices useful in IC devices.

12 Claims, 28 Drawing Sheets

U.S. PATENT DOCUMENTS

| | | | |
|---|---|---|---|
| 4,202,007 | 5/1980 | Dougherty et al. .................... 357/80 |
| 4,302,501 | 11/1981 | Nagashima ......................... 428/304 |
| 4,445,735 | 5/1984 | Bonnefoy ......................... 339/17 M |
| 4,458,297 | 7/1984 | Stopper et al. .................... 361/403 |
| 4,551,673 | 11/1985 | Barth et al. ...................... 324/158 F |
| 4,636,919 | 1/1987 | Itakura et al. ...................... 361/414 |
| 4,675,243 | 6/1987 | Obinata et al. .................... 428/210 |
| 4,730,159 | 3/1988 | Collins ............................ 324/158 F |
| 4,731,643 | 3/1988 | Dunham et al. ...................... 357/68 |
| 4,748,495 | 3/1988 | Kucharek ............................. 357/82 |
| 4,768,154 | 8/1988 | Sliwkowski et al. ................ 364/468 |
| 4,799,617 | 1/1989 | Friedman ........................ 228/180.2 |
| 4,812,792 | 3/1989 | Leibowitz ........................... 333/238 |
| 4,814,945 | 3/1989 | Leibowitz ........................... 361/414 |
| 4,838,800 | 6/1989 | Lynch ................................... 439/78 |
| 4,861,251 | 8/1989 | Moitzger ............................. 425/116 |
| 4,881,905 | 11/1989 | Demler, Jr. et al. ................... 439/79 |
| 4,912,603 | 3/1990 | Seyama ............................... 361/409 |
| 4,935,584 | 6/1990 | Boggs ................................. 174/262 |
| 4,956,749 | 9/1990 | Chang ................................. 361/414 |
| 4,960,386 | 10/1990 | Stanevich ........................... 439/374 |
| 4,969,826 | 11/1990 | Grabbe ................................... 439/66 |
| 4,982,311 | 1/1991 | Dehaine et al. .................... 361/388 |
| 4,991,115 | 2/1991 | Guthrie et al. ...................... 364/520 |
| 4,994,938 | 2/1991 | Baudouin ........................... 361/401 |
| 5,009,611 | 4/1991 | Regnier .............................. 439/326 |
| 5,012,924 | 5/1991 | Murphy .............................. 206/331 |
| 5,019,946 | 5/1991 | Eichelberger et al. ............. 361/414 |
| 5,136,123 | 8/1992 | Kobayashi et al. ................. 174/258 |
| 5,155,577 | 10/1992 | Chance et al. ........................ 357/71 |
| 5,162,792 | 11/1992 | Morris ........................... 340/825.79 |
| 5,165,984 | 11/1992 | Schoenthaler ....................... 428/195 |
| 5,185,502 | 2/1993 | Sheperd et al. .................... 174/262 |
| 5,220,490 | 6/1993 | Weigler et al. ..................... 361/409 |
| 5,222,014 | 6/1993 | Lin ....................................... 361/414 |
| 5,227,013 | 7/1993 | Kumar ................................ 156/644 |
| 5,291,375 | 3/1994 | Mukai ................................ 361/760 |
| 5,309,324 | 5/1994 | Herandez et al. .................... 361/734 |
| 5,319,224 | 6/1994 | Sakashita et al. .................... 257/676 |
| 5,417,577 | 5/1995 | Holliday et al. ....................... 439/91 |
| 5,424,492 | 6/1995 | Petty et al. ............................ 174/250 |
| 5,490,040 | 2/1996 | Gaudenzi et al. .................... 361/773 |
| 5,491,364 | 2/1996 | Brandenburg et al. ............... 257/786 |
| 5,500,862 | 3/1996 | Kawamura ......................... 371/22.3 |
| 5,544,018 | 8/1996 | Sommerfeldt et al. .............. 361/792 |
| 5,545,301 | 8/1996 | Friese et al. ......................... 204/425 |
| 5,578,870 | 11/1996 | Farnsworth et al. ................. 257/727 |
| 5,584,721 | 12/1996 | Taniuchi et al. ...................... 439/374 |
| 5,587,944 | 12/1996 | Shen et al. ........................... 365/175 |
| 5,596,205 | 1/1997 | Reedy et al. ............................. 257/9 |
| 5,634,093 | 5/1997 | Ashida et al. ....................... 395/143 |
| 5,644,500 | 7/1997 | Miura et al. ......................... 364/490 |
| 5,684,332 | 11/1997 | Chen et al. ........................... 257/786 |
| 5,686,699 | 11/1997 | Chu et al. ............................ 174/52.4 |
| 5,691,569 | 11/1997 | Palmer ................................. 257/692 |
| 5,729,432 | 3/1998 | Shim et al. ........................... 361/690 |
| 5,730,606 | 3/1998 | Sinclair ................................... 439/70 |
| 5,745,374 | 4/1998 | Matsumoto ......................... 364/491 |
| 5,774,340 | 6/1998 | Chang et al. ........................ 361/771 |
| 5,781,446 | 7/1998 | Wu ....................................... 364/489 |
| 5,784,262 | 7/1998 | Sherman .............................. 361/777 |
| 5,784,264 | 7/1998 | Tanioka ................................ 361/803 |
| 5,786,631 | 7/1998 | Fishley et al. ....................... 257/701 |
| 5,790,383 | * 8/1998 | Inagawa ............................... 361/760 |
| 6,087,732 | * 7/2000 | Chittipeddi et al. ................. 257/786 |

\* cited by examiner

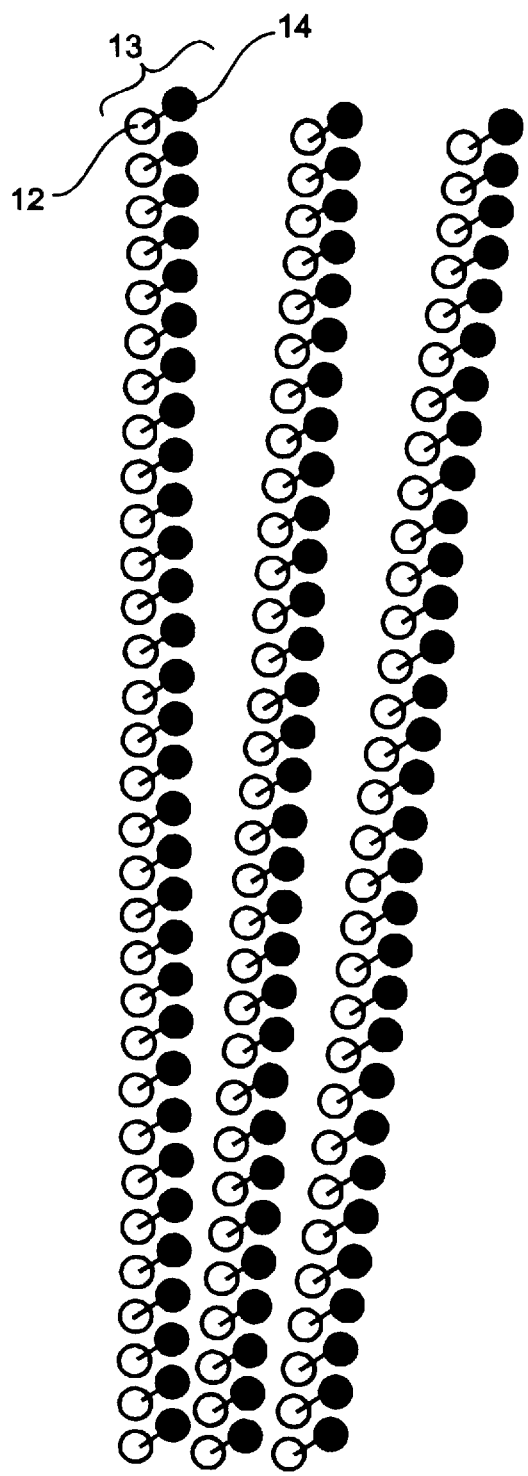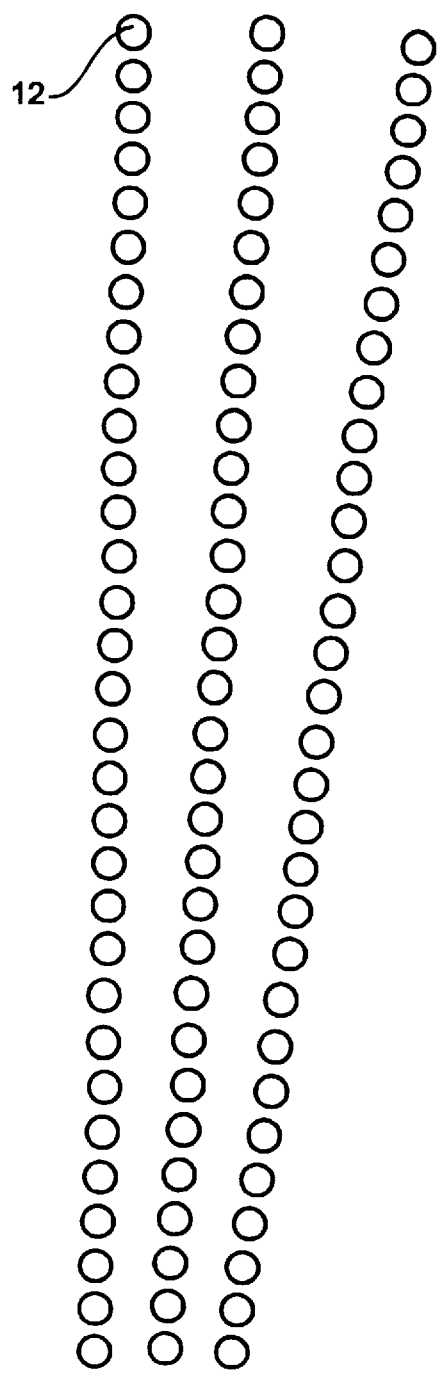
FIG. 13A  FIG. 13B

ROUTABLE HIGH-DENSITY INTERFACES FOR INTEGRATED CIRCUIT DEVICES

CROSS REFERENCE TO RELATED APPLICATION

This application takes priority under 35 U.S.C. §119(e) from U.S. provisional application Ser. No. 60/110,762, filed Dec. 3, 1998, which is incorporated by reference herein in its entirety.

BACKGROUND OF THE INVENTION

Modern interfaces for Integrated Circuit (IC) packages, chips, and other devices have ever-increasing terminal densities. Many modern IC devices have so many terminals so tightly clustered that it becomes difficult to construct mutually-segregated conductors to connect carrier lines to each terminal. Signal-carrying terminals and lines are particularly burdensome, since they must be segregated from each other as well as from power and ground lines. Signal lines on an IC device or carrier must have sufficient electrical isolation from other conductors that undesired coupling and leakage paths are avoided.

Terminals in a pattern are principally described by their locations (i.e., of the center point) and their shape (typically square or roundish, and ring-shaped for metal-lined through holes). Each may be coupled to other terminals in the same plane (e.g., a via coupled to a pad). Depending on the structure of circuitry connecting to a set of terminals off-plane, terminals may be categorized as no-connects, power terminals, ground terminals, and signal terminals for connecting to signal lines. The terminal configuration of a pattern is typically repeated in two or more parallel layers, each terminal in each layer coupling to a corresponding terminal on the parallel layer(s).

In this document, an "interface" is a configuration of conductors and dielectrics arranged to provide electrical coupling to an IC device. An interface generally comprises an inward routing (toward the device) and an outward routing (away from the device) in directions parallel to a reference plane. Most typically, routing on an IC device and the carrier on which it is mounted have a significant cost and technology differential. For this reason, routability of an interface in one direction (i.e., inward or outward) has a much larger cost impact on the system than routability in the other. Despite this, few interface designs to date depart from fully dense terminal grids with uniform circumferential spacing. These interfaces do not dislocate terminals but provide routability in less desirable ways such as adding layers.

A "pattern" of terminals most commonly comprises substantially all terminals on a surface of one given type, so terms like "via pattern" and "bond pad pattern" are customary. "Routability" of a pattern or inter-terminal zone refers to the context-dependent technical possibility of positioning routing lines so that all signals may escape (inward or outward) from a given pattern. The context of the routing comprises the number of routing layers, the routing line widths and clearances, the terminal sizes and required clearances, the shielding scheme, protections against ground bounce, and other design constraints known in the art.

Commonly used interface schemes for IC packages include Pin Grid Array (PGA), Ball Grid Array (BGA), and Land Grid Array (LGA). PGA packages have an array of pins that are inserted into through-hole pads in a Printed Circuit Board (PCB). BGA packages have an array of pads and are mounted by soldering these pads on the package directly to surface pads on the mount side of the PCB. LGA packages have an array of metal stubs and are mounted to the PCB in a clamp with a compressible interposer material placed between the package and the PCB. For PGA, BGA, and LGA packages the patterns of pads on the PCB (and in the case of LGA—the conductive pattern in the interposer) match the pattern of the pins or pads on the package. These package types can usually interface with a socket also, such as for testing.

IC dies typically connect to the substrate within the IC package using either wire bond or Flip-Chip technology. Flip-Chip is used for high pin count IC dies. The "pins" on a Flip-Chip die are called bump pads. As with the package array technologies, there is a matching pattern of pads on the package substrate. Interconnect on the package substrate is typically used to connect the pads on the substrate (connected directly to the IC die) to the pins, pads, or stubs on the surface of the package that gets inserted, soldered, or pressed to the PCB.

Most PGA, BGA, and LGA arrays use a square or staggered "gridded" terminal pattern. As the number of pins in IC's increase and with the need to keep these packages small, the spacing between package pins can be as small as 0.5 mm. Since these arrays can have as many as 60 pins on each side and because PCB design rules have minimum trace widths and clearances of 3–4 mils, typically, many PCB signal layers are required to be able to interconnect to the pins of the package. Line, terminal, and dielectric width rules exemplify conventional Design Rules used in the art to confirm a design's quality before construction. PCB designers assure compliance with Design Rules with software tools called Design Rules Checkers (DRC's). See U.S. Pat. Nos. 5,634,093 and 4,768,154. In FIG. 1 of the former patent, Design Rule File 2c has rules for clearances between various object pairings, and conformity of a given layout is confirmed by Wiring Pattern Checking Unit 5. In fact, DRC's can readily confirm that a given pattern complies with any requirement, criterion, or preference stated with sufficient particularity. This simplifies the pattern designer's task to a mere repositioning of terminals that cause a violation of a Design Rule.

To enable routing in highly dense IC packages, micro-via, blind via, buried via, staggered via, and other technologies have become more common. Similarly, additional layers in IC package substrates are required for interconnections to flip-chip dies. Technologies such as these substantially increase the cost of carrier manufacture, compromising product yields, performance, and reliability. The present invention allows the design of interfaces for high pin count IC devices such that the interface footprints can be small (typically allowing smaller packages), that the carrier can be designed with fewer layers, that more stringent design rules can be satisfied, and that the use of expensive manufacturing processes can be minimized.

SUMMARY OF THE INVENTION

The present invention comprises a pattern for an improved interface with routable coupling to substantially all of the signal lines on one "surface" of an IC device. A "surface" of the present invention is typically planar, and typically has a convex outer perimeter. It may also have a convex inner perimeter defining its center. "Substantially all" signals, terminals, or lines may exclude at most about 1–10% of the named set, such as anomalous groups of signal-carrying terminals near a corner or similar groupings. The inventive interface comprises a multiplicity of terminals each coupled to one of the IC device's signal lines.

Terminals are arranged into patterns, each pattern comprising substantially all terminals of a given "type" within the pattern's area—i.e., that are arranged for routing lines off of the plane in a first direction. A selected area of a horizontal PCB may, for example, have a pattern of bond pads arranged for routing lines upward intermingled with a pattern of vias for routing lines downward. An intermediate dielectric layer of a ceramic package has a pattern of vias for routing lines both upward and downward from some reference plane. Terminal patterns as described herein can be employed for patterning of vias, micro-vias, pins, bump pads, bond pads, ball pads and like connectors employed in IC chips, IC package layers and PCB layers.

The present invention partitions the terminals of a pattern into mutually exclusive groups distributed about the center of the pattern. In the common usage of carrier manufacturing (including, but not limited to, that of PCB's, sockets, multi-chip modules, or plastic IC packages), the "center" of a pattern may be either a region with few signal terminals or a center point. For typical designs, the center of the pattern is near the center axis of the device. For simplicity, it is preferable that a terminal group be "contiguous," i.e. contained within a single polygon of fewer than 10–20 sides that excludes terminals of other groups.

Each of the groups of the present invention comprises a plurality of terminals clustered along a "reference segment." The reference segments have no physical manifestations per se, but are constructs for arrangements of terminal groups. Several constraints limit the shape and position of the segments. They are generally curvilinear—i.e., arcuate, linear, zigzag, wavy, or having similar shape characteristics and zero width. They can optionally coincide with a segment of directly outward ray—i.e., one that extends directly outward from the center axis or region to the pattern perimeter. As the segments extend outward, they do not double back. That is, each has a rotational position about the center that is a function of the offset distance from the center—i.e., each extends "generally outward." The segments extend continuously from the center of the terminal pattern to the (outer) perimeter of the pattern. They do not cross or overlap the center or one another. Each segment desirably projects within about 30–60 degrees of a ray directly outward from the nearest part of the center.

Reference segments intersect the outer perimeter of the pattern in an annular series of points progressing around the perimeter. Reference segments each extend continuously from the center and do not overlap, and are thus distributed in a successive sequence about the center. A "successive pair" of reference segments is any reference segment with either a clockwise or counterclockwise neighboring segment. A "successive pair" of groups (comprising a first group and a second group) also describes those associated with a successive pair of reference segments. K (an integer) segments or groups are circuitously distributed about the center. The number of successive pairs likewise successively distributed about the center will be K (rather than K−1). The two elements of a "successive pair" are sometimes distinguished from one another as a "left" and a "right" for convenience.

In contrast to the broad term "clustered along," the terms "aligned along," "collinear," and "positioned on" are used narrowly in this document to describe exact alignment (i.e., centered on with a zero offset). Terminals in a group need not be positioned on the group's reference segment—i.e., they are optionally staggered near it or touching it but not centered on it. Almost all (at least about 90%) of the terminals in each group are each closer to the group's reference segment than to any of the other reference segments. In a preferred pattern, at least about 50–95% of the terminals in a group are each closer to at least one terminal in the group than to any terminal in another group. For higher terminal density, terminal staggering and non-radial alignment are desirable within each group. Preferably, fewer than about 50–95% of the groups each consist of collinear terminals aligned along a radial ray. Alternatively, at least about 5–50% of the K groups are preferably arranged so that less than half of the group's terminals are on any one ray extending directly outward from the center. More preferably, less than about 10–25% of a group's terminals are on any one ray extending directly outward from the center.

"Routability zones" described herein are non-overlapping, one-piece channels each extending continuously from the center to the perimeter of a pattern, each situated between a successive pair of terminal groups of a pattern, and meeting width and configuration specifications as defined and claimed herein. The routability zones are successively distributed about the center, each having a left boundary (or "side") tangent to the left group and a right boundary tangent to a right group. A routability zone is preferably at least about 2–200 times wider than the pattern's median inter-terminal spacing (the median distance between each terminal and its nearest neighbor, across all of the terminals of the pattern) over at least about 20–60% of its length. For simplicity, it is preferred that a zone does not overlap the pattern's reference segments.

The number of qualifying routability zones described herein will be labeled "L," an integer. In a number of routing layers parallel to the reference plane, each routability zone pools spatial resources for more efficient routing. Routability zones are preferably dispersed and numerous: If a pattern comprises K groups, the present invention comprises at least about 0.5K to 0.99K such routability zones distributed about the center. Because of the foregoing constraints, only one zone between each successive pair of terminal groups can count as a routability zone. Thus, $K \geq L$.

"Signal-carrying" customarily refers to lines and terminals positioned or programmed so that they can readily be used to carry information or to trigger events during device operation. In a preferred pattern, each routability zone is bounded by (i.e., adjacent to) a plurality of signal-carrying terminals belonging to a first group, each closer to a next-innermost or next-outermost terminal in the group than to any terminal in another group of the pattern. The plurality preferably comprises at least 3–20 terminals. It is preferred that the plurality of terminals be "consecutive." A terminal is "consecutive" with another terminal if no terminal in the pattern intersects the line segment between their centers. A set of three or more terminals are "consecutive" (i.e., in a substantially contiguous grouping) only if each of them is consecutive with another of them. A group of terminals "bounds" a zone if any terminal in the group is adjacent to the zone.

Some families of zone shapes facilitate routability more than others. For optimizing outward escape routes of an interface design, it is desirable that at least half of the routability zones are generally wedge-shaped in an outward direction—i.e., constructed so that the widest portion of each zone is adjacent to a point on the outermost third of each neighboring group. A similar outwardly-opening result is obtained if the width of at least half of the routability zones increases substantially monotonically as a function of distance from the center. More preferably, at least about 75–95% of the zones meet one of these criteria. Inward escape routes are similarly optimized by reducing the offset of the innermost third (i.e., lowest ranking) of the terminals in a group so that they have a lower average segment offset magnitude than the other terminals in the group, and a greater dispersion in the outward or radial direction.

BRIEF DESCRIPTION OF THE DRAWINGS

FIG. 13A is a schematic of several diagonally-offset via fanouts comprising vias and pads (like that of FIGS. 3A & B) forming part of a radial interface.

FIG. 13B shows a portion of the via pattern.

DETAILED DESCRIPTION OF THE INVENTION

The term "offset" (magnitude) from a terminal to an object as used herein refers to the distance between the terminal's center and an appropriate point of the object. A terminal's offset from another terminal is thus the distance between the centers of the two terminals. A terminal's offset from a group's reference segment is the distance from the center of the terminal to the nearest point(s) of the center or segment. Terminal may be offset on either side of a reference segment. A terminal in the pattern can also be characterized by its distance from the pattern center. (A pattern center may be a center point or a central region.) A useful statistic of a terminal in a terminal group is the distance between the center of the terminal and the nearest point on the group's reference segment, the terminal's "segment offset." Terminals in the group can be ranked according to their offset from the (nearest point of the) pattern's center, or according to the distance along the reference segment from the pattern's center to the segment's nearest point to the terminal. "Low ranking" terminals herein are those having a smaller distance so measured.

Figure 1:
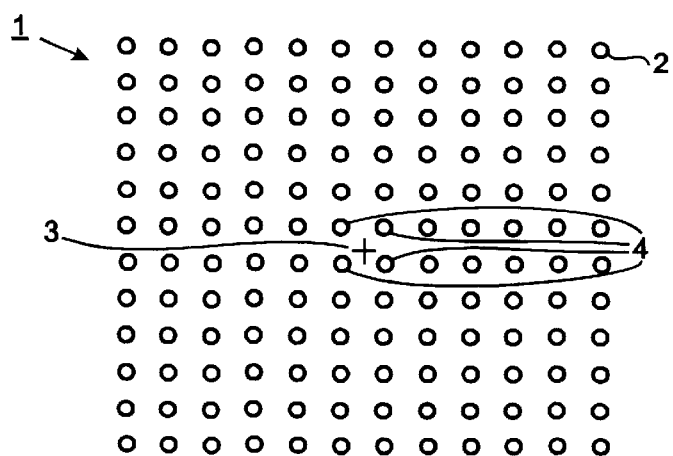
FIG. 1 (from U.S. Pat. No. 5,491,364) depicts a standard, fully dense grid array typical of low pin count IC devices.

FIG. 1 (from U.S. Pat. No. 5,491,364) depicts a standard, fully dense grid array of terminals 1, typical of low pin count IC devices. Node 2 is a reference point within a conductive contact structure such as a package pin in a Pin Grid Array (PGA), a ball in a Ball Grid Array (BGA), a tubular via structure penetrating a printed circuit board (PCB), a BGA pad, or the like as known in the art. Center axis 3 of grid array 1 is equidistant from the four innermost terminals 4 of grid array 1 (i.e., the four "neighboring terminals").

Figure 2:
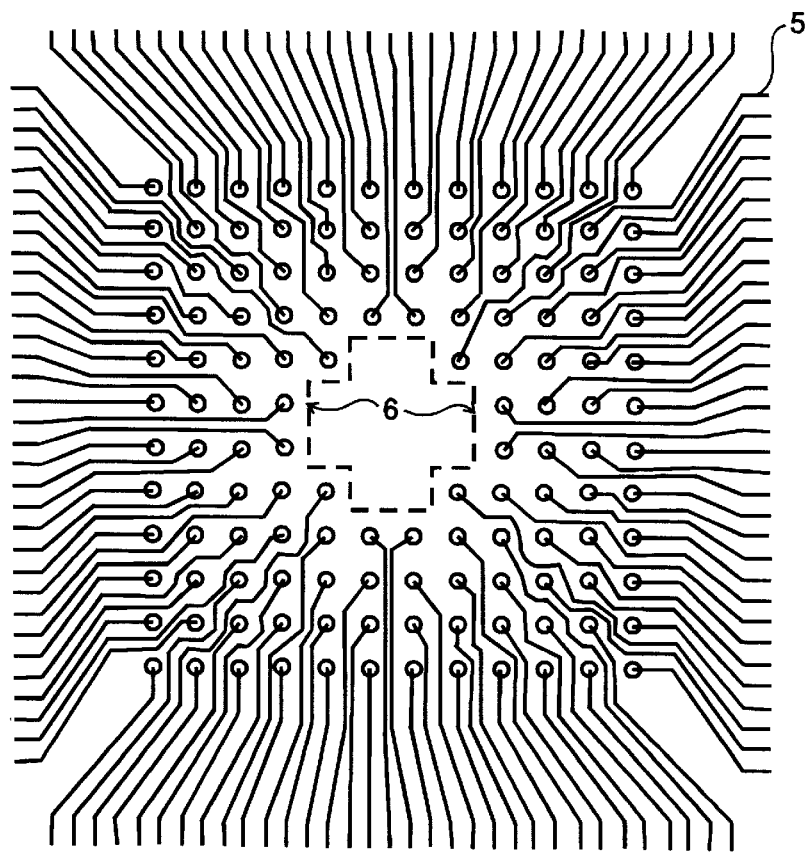
FIG. 2 (from U.S. Pat. No. 5,491,364) depicts a similar array, also showing a single-layer set of PCB routing lines for electrical connection between each node and remote points on the PCB.

FIG. 2 (from U.S. Pat. No. 5,491,364) depicts a similar fully-dense grid array, also showing a single-layer set of PCB routing lines 5 for electrical connection between each node and remote points on the PCB. Each node in the array is generally assigned a clearance zone within which there are no other conductors, to prevent accidental shorting. Each of the routing lines 5 is also a conductor with an assigned clearance zone. The center 6 of the array of FIG. 2 is a region with few signal terminals or no signal terminals, shaped like a "plus" sign. It is common for a device interface to leave the center of a pattern substantially unused, or to use it for power and ground pin connections.

Figure 3A:
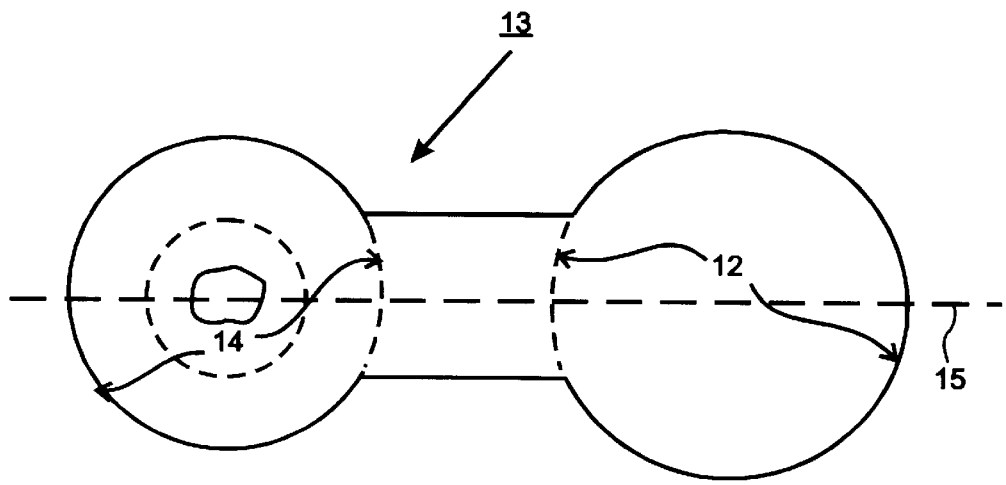
FIG. 3A depicts the top view of a typical fanout via comprising a bond pad electrically coupled to a hollow, plated tubular via.
Figure 3B:
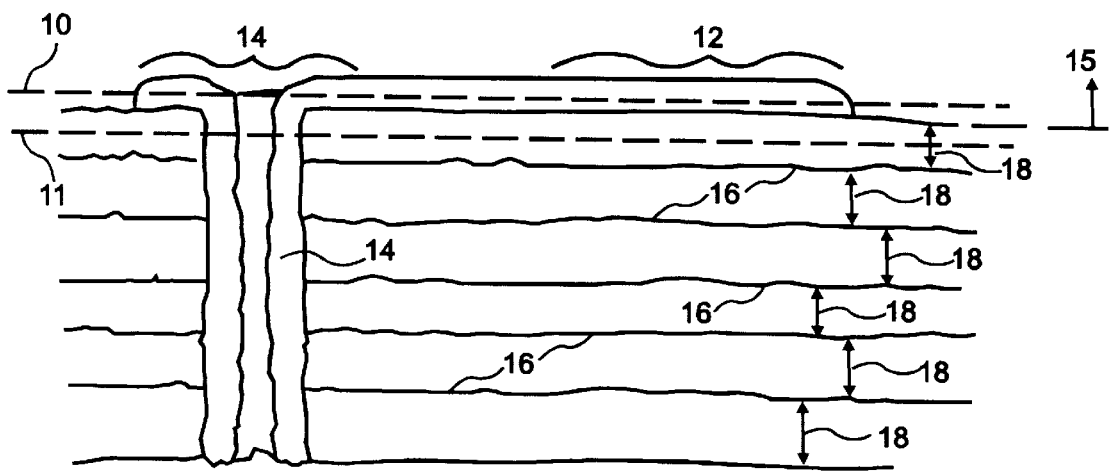
FIG. 3B is a verical cross-section at the center of the via shown in FIG. 3A.
Figure 3C:
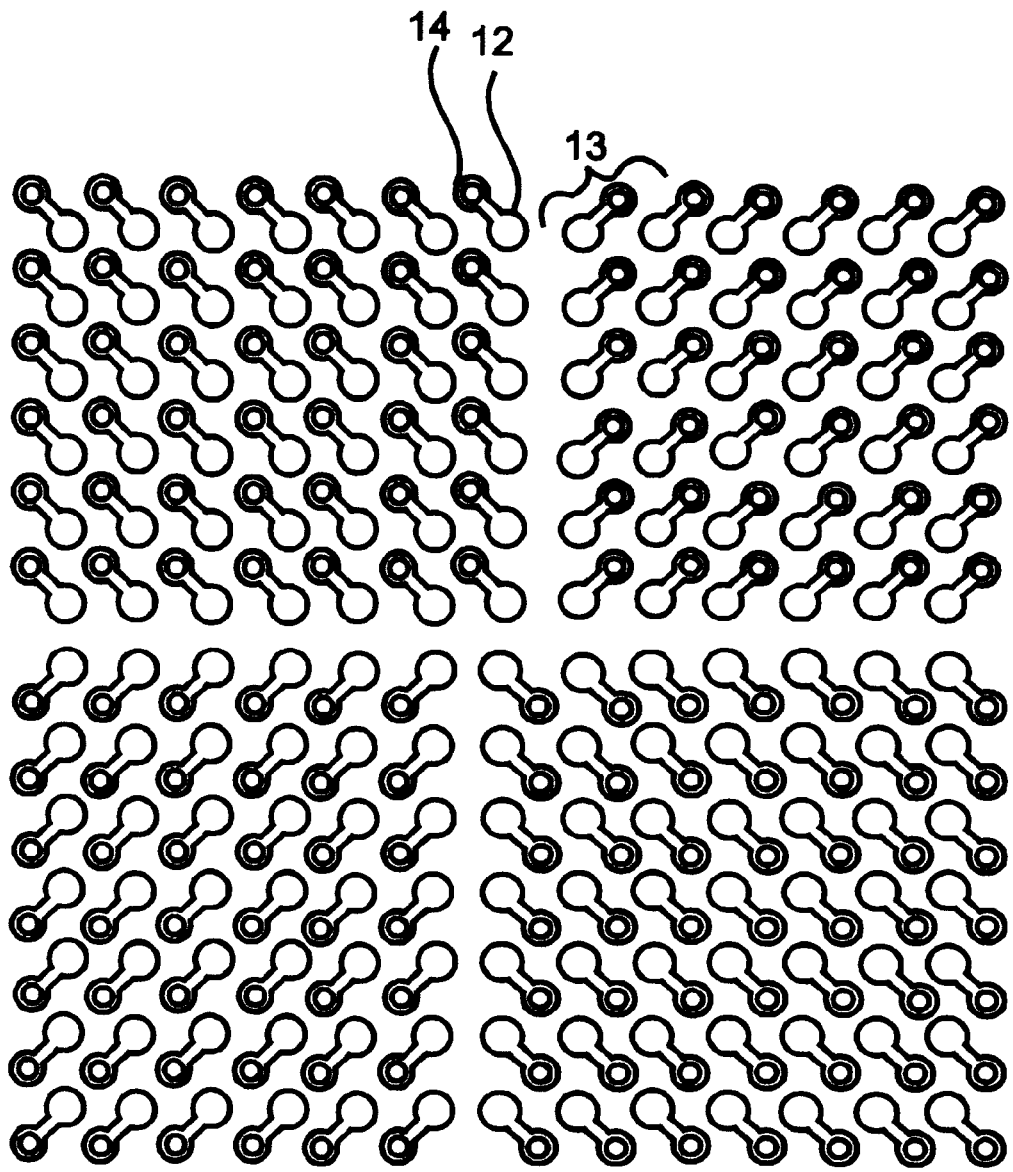
FIG. 3C depicts a fully dense array of the vias shown in FIG. 3A.

FIG. 3A depicts the top view of a typical plated thru-hole fanout via 13 comprising bond pad 12 electrically coupled to a tubular metal via 14. Bond pad 12 is constructed and arranged for mounting a device terminal (pin or ball, e.g.), and via 14 provides electrical connection to lines on deeper routing layers 16 on the carrier. FIG. 3B depicts a cut-away cross section of fanout via 13 at vertical plane 15. Five routing layers 16 are interleaved between six dielectric layers 18. Bond pad 12 has a terminal at reference plane 10 on the "mount side" 15 of the PCB. Note that the via 14 is somewhat wider at reference plane 10 than at reference plane 11. Structures similar to fanout via 13 are widely used to circumvent yield loss resulting from trying to bond device terminals directly onto vias. FIG. 3C (from U.S. Pat. No. 5,784,262) depicts a fully dense, 13×13 square grid of bond pads 12, each coupled to a diagonally-offset via 14. For ease of design, some reference node within each fanout via 13 is typically on a regular square grid, even though the overall pattern of these structures need not be regular or symmetrical.

Figure 4:
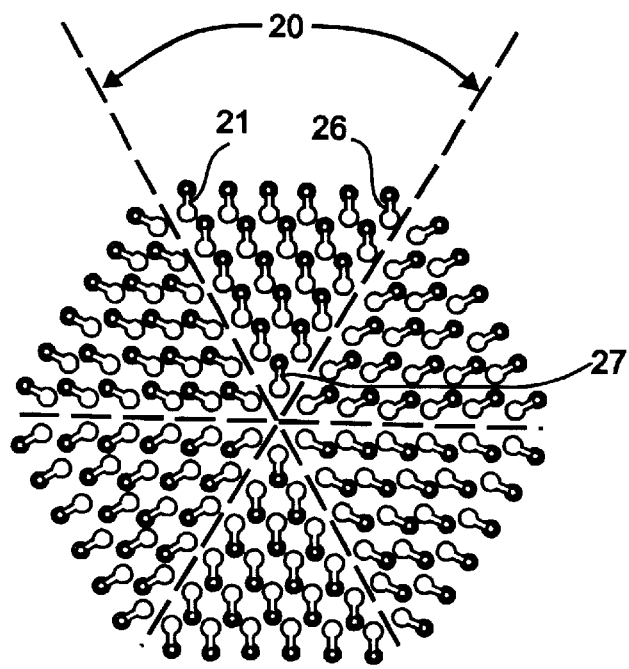
FIG. 4 (from U.S. Pat. No. 5,784,262) depicts similarly-shaped fanout vias in a concentric-hexagon configuration.

FIG. 4 (from U.S. Pat. No. 5,784,262) depicts similarly-shaped fanout vias in a concentric-hexagon configuration. Wedge 20 comprises six parallel linear rows. The innermost row within wedge 20 comprises only one via fanout 27, and the outermost row within wedge 20 comprises six collinear via fanouts 21 through 26.

Figure 5:
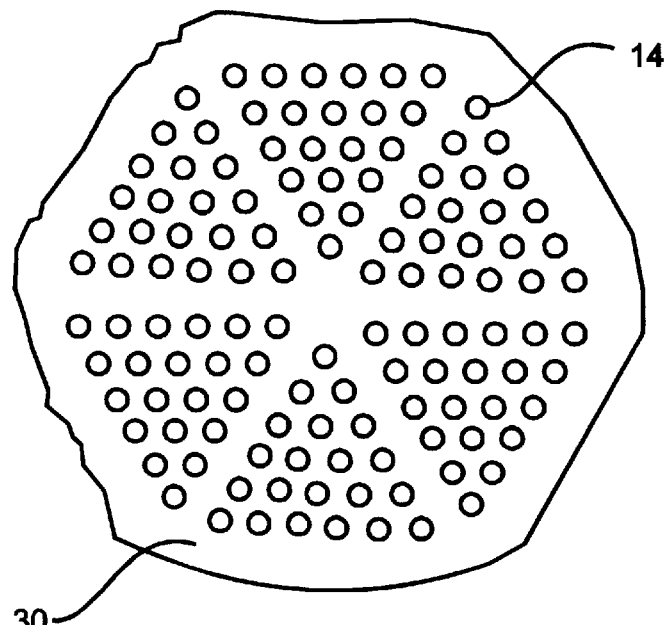
FIG. 5 (from U.S. Pat. No. 5,784,262) depicts the cross-section of the vias of FIG. 4 as circles, approximating the position of metallic terminals in an embodiment of this cross-sectional pattern comprising plated through-holes.

FIG. 5 (from U.S. Pat. No. 5,784,262) depicts the cross-section of the vias of FIG. 4 as circles, approximating the position of metallic terminals in an embodiment of this cross-sectional pattern comprising plated through-holes. Within each circle 14 of this cross section is a gas or vacuum dielectric, and a dielectric like glass, ceramic, plastic, or fiberglass would provide electrical isolation means 30 between the circles known in the art. Vias 14 may, of course, be more like a solid cylinder with a flange at one end.

Figure 6A:
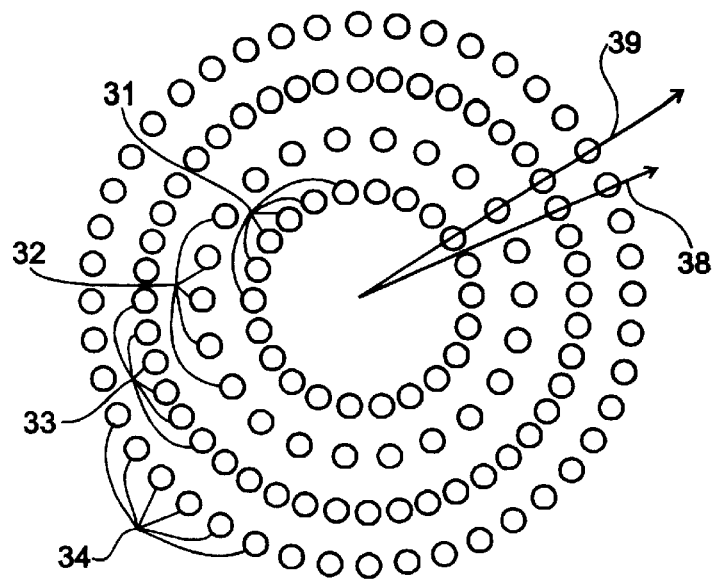
FIG. 6A (from U.S. Pat. No. 5,491,364) depicts a prior art terminal configuration comprising four concentric circular rows of nodes.

FIG. 6A (from U.S. Pat. No. 5,491,364) depicts a prior art terminal configuration comprising four concentric circular rows of nodes 31,32,33,34. The innermost two rows 31,32 each comprise 22 nodes, and the outermost two rows 33,34 each comprise 44 nodes. Two collinear terminals lie along radial (linear) spoke 38, and four collinear terminals intersect radial spoke 39. All 132 nodes reside on 44 uniformly-dispersed spokes, successively alternating a 2-terminal spoke with a 4-terminal spoke about the center.

Figure 6B:
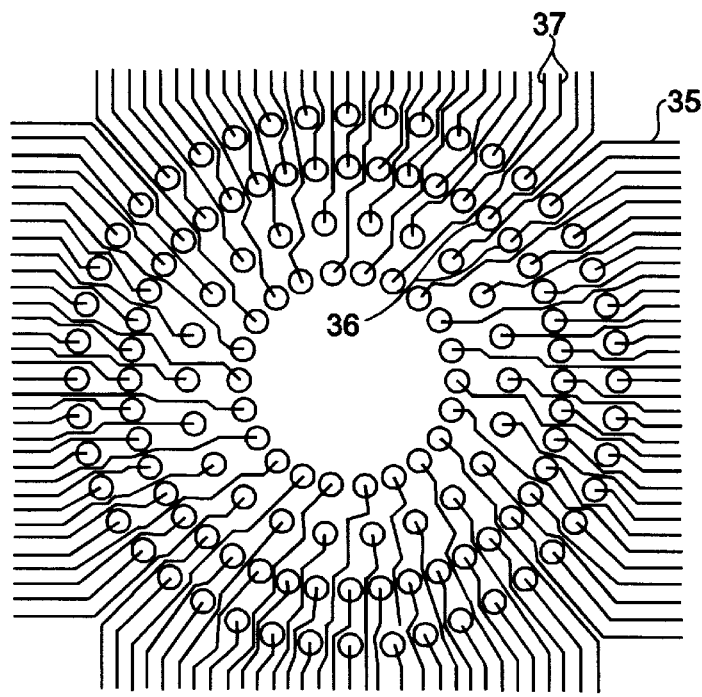
FIG. 6B (from U.S. Pat. No. 5,491,364) depicts a routing scheme showing outward escape routes for all 132 nodes of FIG. 6A.

FIG. 6B (from U.S. Pat. No. 5,491,364) depicts a routing scheme showing outward escape routes for all 132 nodes of FIG. 6A. The third-innermost circular row 33 is sufficiently dispersed to allow one escape route 35 between each successive pair of terminals 36. The outermost row 34 is sufficiently dispersed to allow two escape routes 37 between each successive pair of terminals.

Figure 7:
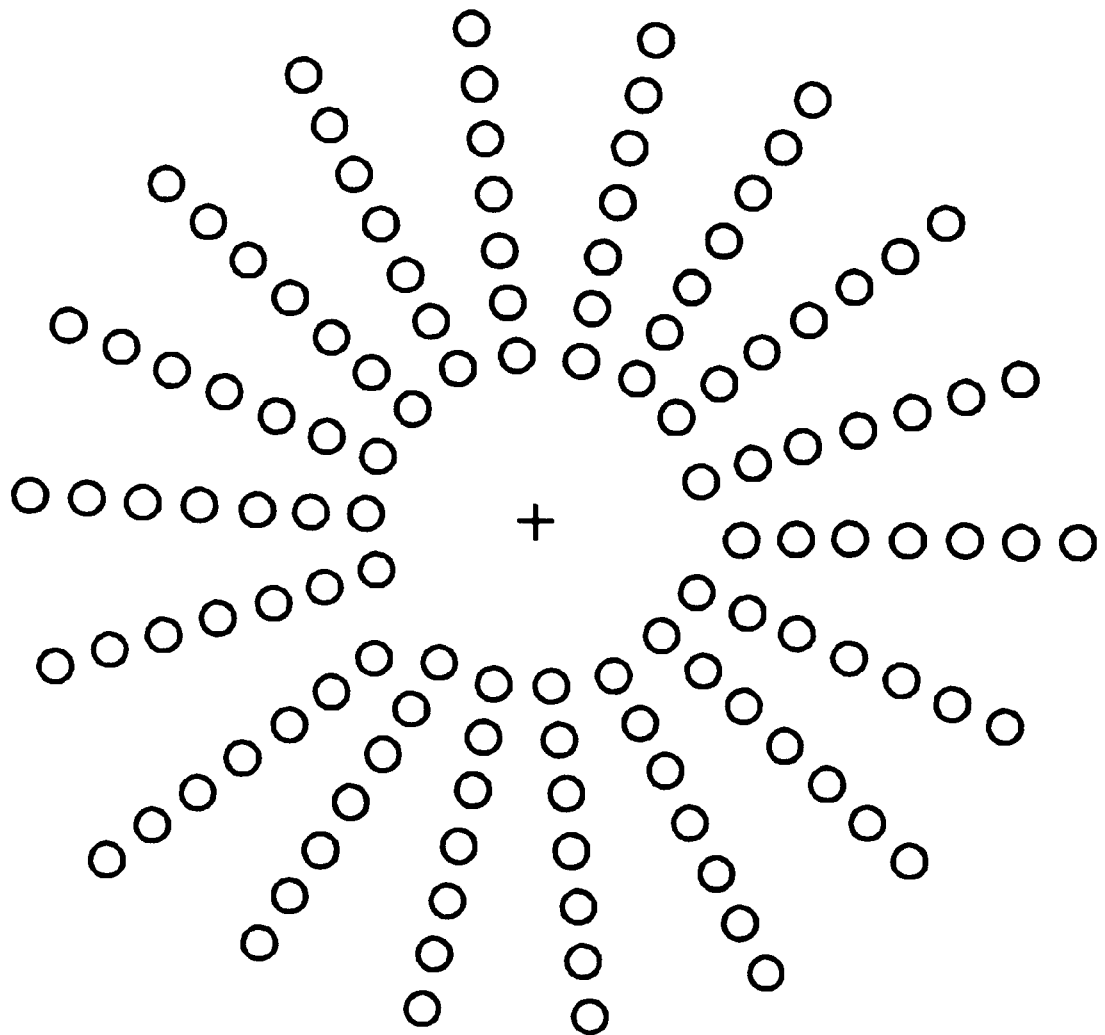
FIG. 7 depicts a radial array of 7 rows of 18 terminals each.

FIG. 7 depicts a radial array of 7 rows of 18 terminals each.

Figure 8:
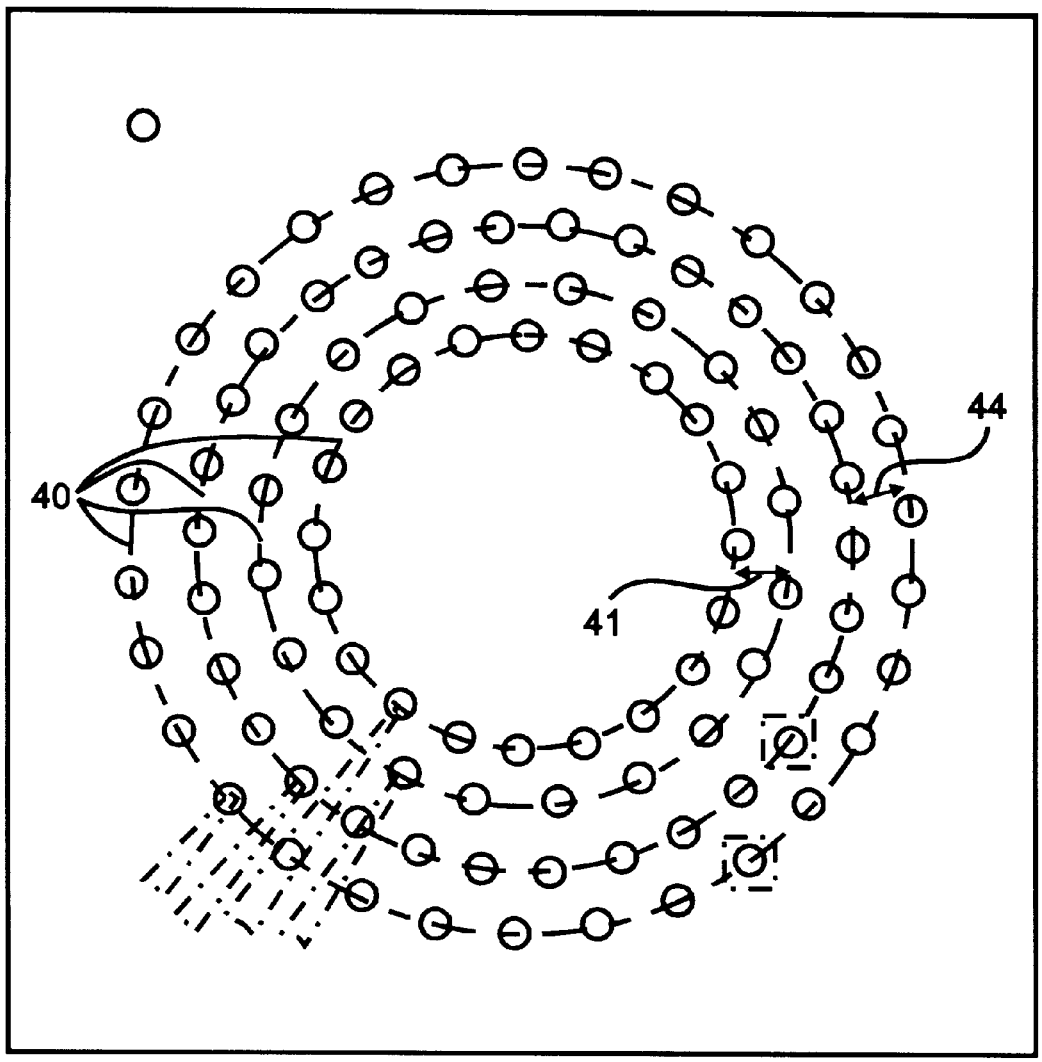
FIG. 8 (from U.S. Pat. No. 3,795,845) depicts another concentric-circle terminal pattern showing the circles upon which each row of terminals lies.

FIG. 8 (from U.S. Pat. No. 3,795,845) depicts another concentric-circle terminal pattern showing the (dashed) circles 40 upon which each row of terminals lies. The term "lanes" is used herein to refer to annular areas 41,44 between concentric shapes 40 on which rows of terminals. Outermost lane 44 separates the two outermost terminal rows, and innermost lane 41 separates the two innermost rows. Close inspection reveals that outermost lane 44 is wider than innermost lane 41, and that the terminals are in a regularly staggered arrangement along each of these two lanes 41, 44. This terminal layout does not arrange a significant number of terminals on radial rays or in collinear groups. It does not arrange terminals in orderly groups clustered generally outward from the center to provide channels as described and claimed herein, however.

Figure 9:
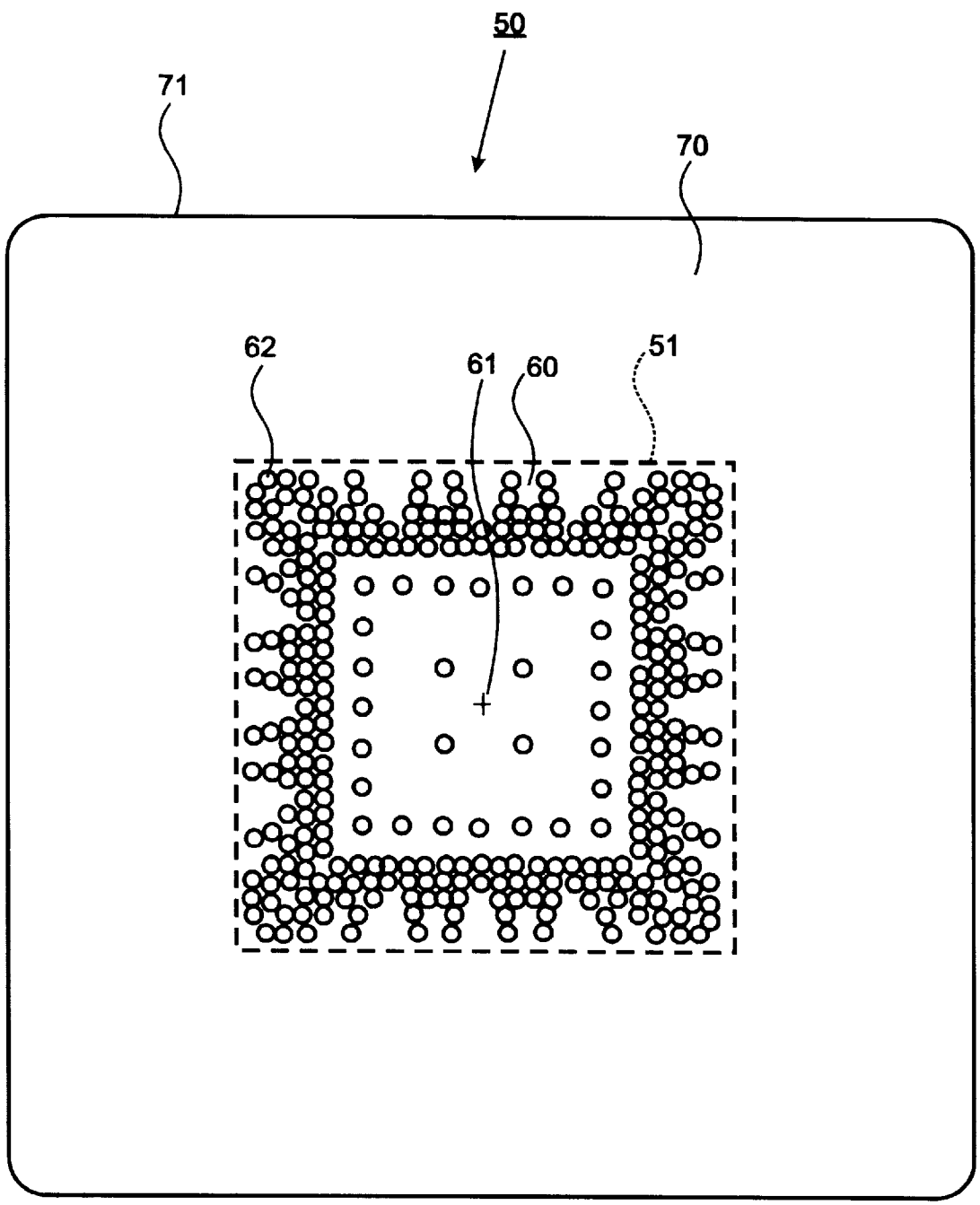
FIG. 9 (from U.S. Pat. No. 4,731,643) depicts bond pads of an IC chip.

FIG. 9 (from U.S. Pat. No. 4,731,643) depicts bond pads of an IC chip. From the outside, the chip has a generally rectangular central area 60 and a ring-shaped or annular outer area 70 extending to the edge 71 of the chip. The boundary between these two areas, which substantially follows the shape 71 of chip 50, is represented by dotted line 51. Like the "reference segments" of the present invention, this boundary is conceptual and is not a physical feature of the depicted chip.

Central area 60 surrounds a neutral point 61, indicated by tic mark 61. This point is a conceptual tool for calculating wiring distances, thermal expansion distances, and other physical parameters of the chip; the point itself is not a physical feature of the chip. Central area 60 contains an array of conventional C4 or solder-ball I/O contacts 62 for passing electrical signals and power between the chip 50 and a conventional substrate (not shown) of metallized ceramic or other material. The arrangement of contacts 62 (or "terminal layout") is arbitrary, but substantially all of them lie within the boundary 51.

Figure 10:
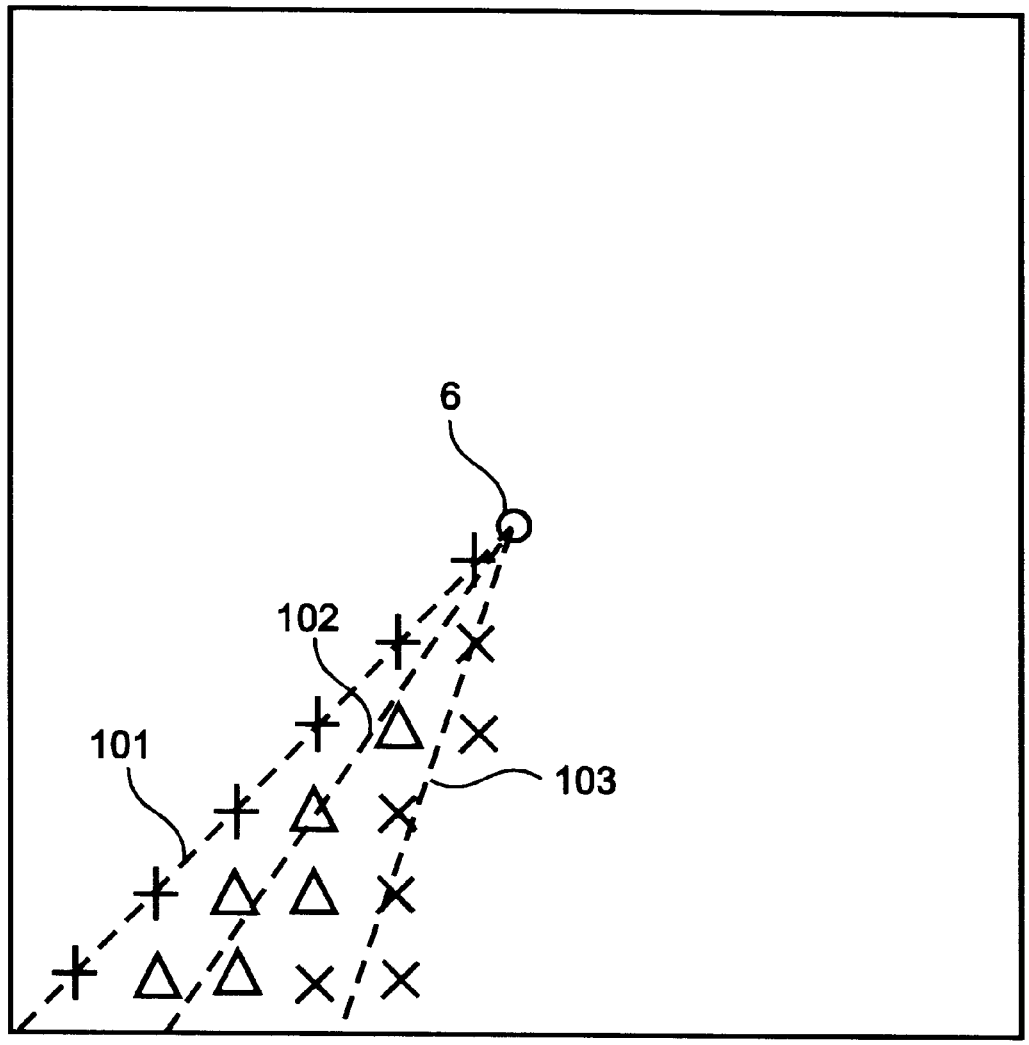
FIG. 10 depicts three groupings of six terminals each, each clustered along a reference segments in a terminal pattern like that of FIG. 1.

FIG. 10 depicts three groupings of six terminals each, each clustered along a reference segment in a terminal pattern like that of FIG. 1. The first group of terminals 101G is a collinear group all marked with a "+" on radial reference segment 101. The second group of terminals 102G is a non-collinear group all marked with a "Δ", clustered along radial reference segment 102. The third group of terminals 103G is a non-collinear group all marked with an "x", clustered along radial reference segment 103. Radial reference segment 102 is one of a "successive pair" of reference segments with either 101 or 103. Each radial reference segment approaches center (point) 6, but excludes the innermost endpoint, so that reference segments never overlap.

Figure 11A:
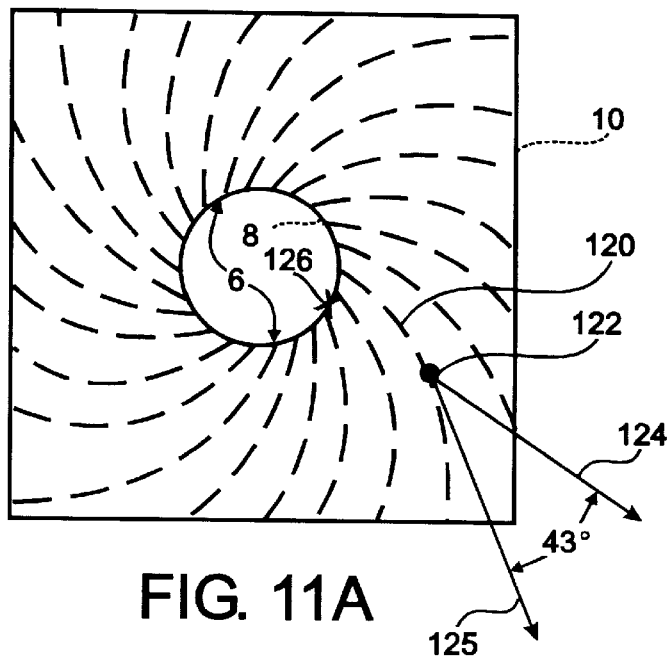
FIGS. 11A and 11B depict examples of reference curves successively distributed about the center of a terminal pattern according to the present invention.
Figure 11B:
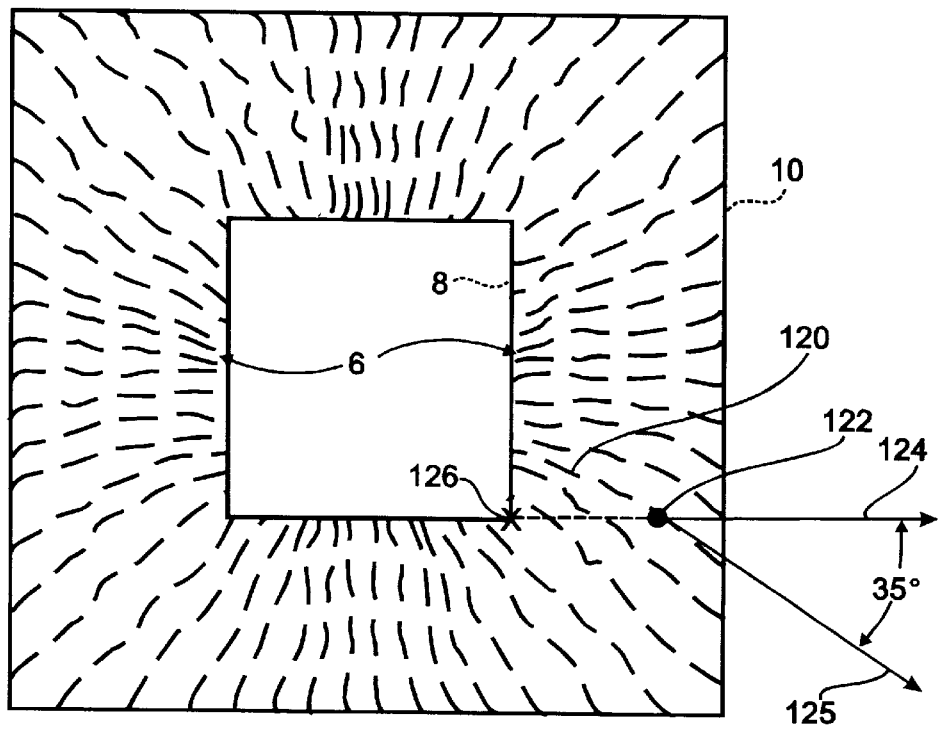

FIGS. 11A and 11B depict examples of reference curves 120 successively distributed about the center region 6 of a terminal pattern (not shown) according to the present invention. The outline of the center region 6 forms an inner perimeter 8 of the pattern. Each reference segment 120 extends continuously from the inner perimeter 8 to the (outer) perimeter 10 of the pattern. For any point 122 along a reference segment 120, one can draw a retreating ray 124 extending directly away from the nearest place on the inner perimeter 126 (not to be confused with a radial ray, which retreats from a center point). One can also draw at least one other ray 125 tangent to that point 122 along reference segment 120. For the preferred reference segments of the present invention, the angle between the retreating ray 124 and the tangent ray 125 will be less than or equal to 45 degrees (i.e., "strictly outward") for all points along all segments in the pattern. These reference segments, perimeters and points need not have physical manifestations, but are conceptual tools helpful for defining appropriate terminal locations. Once understood, they are easily implemented in software as is known in the art.

Figure 12A:
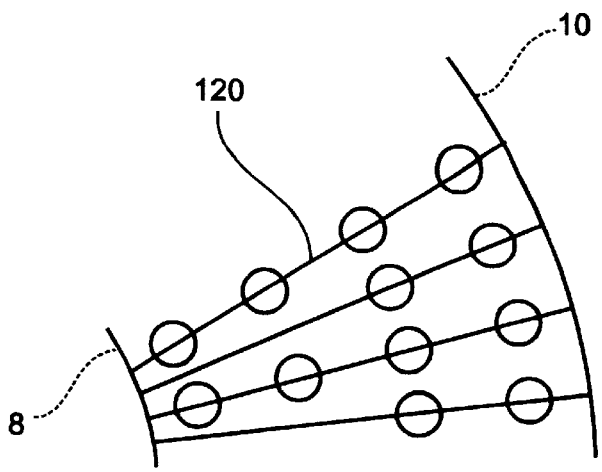
FIG. 12A depicts a portion of the prior art pattern of FIG. 6A, arranged in four terminal groups each collinear with a reference segment corresponding to the group.
Figure 12B:
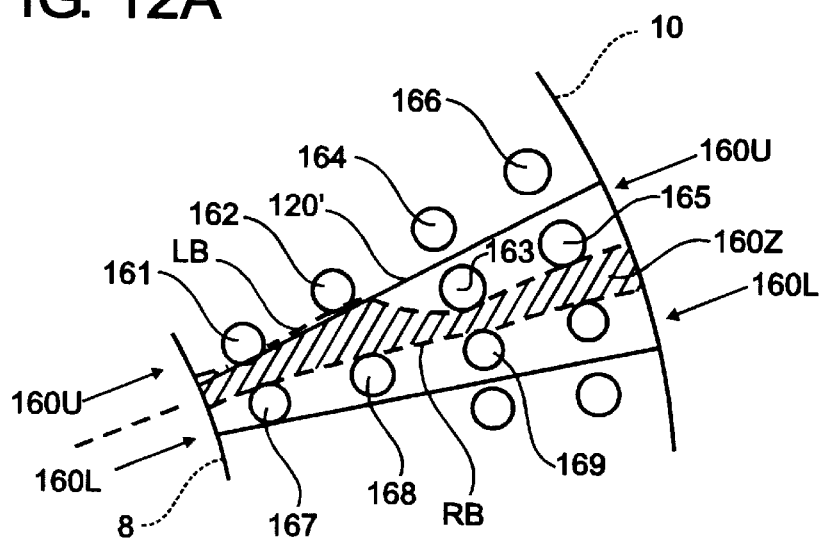
FIG. 12B depicts the same portion with an inter-terminal zone suitable for routing.

FIG. 12A depicts a portion of the prior art pattern of FIG. 6A, arranged in four terminal groups each collinear with a reference segment 120 corresponding to the group. Each segment extends directly outward from the inner perimeter 8 to the outer perimeter 10. FIG. 12B depicts the same portion of the pattern of FIG. 6A, but with another arrangement of reference segments. Terminal 161 is the innermost terminal of the upper group 160U. With regard to terminal 161, the group 160U has one next-innermost terminal 162. With regard to second-innermost terminal 162, the group 160U has two next-innermost terminals 163,164. With regard to terminal 163, terminal 164 is both the next-innermost and the next-outermost terminal in the group 160U. The "next-innermost" terminal of a given terminal, then, is the innermost terminal at least as far from the center as the given terminal. The "next-outermost" similarly corresponds to the as-outermost terminal at least as near to the center as the given terminal—the "nearest as-outermost" terminal.

From FIG. 12B, it can readily be seen that terminal 162 coincides with a widened place along the length of inter-terminal zone 160Z. Terminals 161 and 163 coincide with bottlenecks along the length of inter-terminal zone 160Z. According to the present invention, routability of an inter-terminal zone is greatly improved when at least two bounding (adjacent) terminals of one group are each closer to a next-innermost (innermost next-outermost) terminal in the one group than to any terminal in the other bounding terminal group. None the four terminals 161,162,163,165 of group 160U that bound zone 160Z meet this criterion. Terminal 162 is almost as close to its nearest next-innermost terminal 164 as it is to the nearest terminal in another group, 168. It is thus not surprising that terminal 162 coincides with a wide place in zone 160Z. Terminals 161 and 163 are significant bottlenecks because they are so much closer to terminals 167 and 169, respectively, than to their respective nearest next-innermost terminals, 162 and 164.

Interfaces of the present invention are distinct from the prior art because of the increased quantity and/or quality of "Major Routing Zones" (MRZ). MRZ's are three-dimensional zones between groups of vias. MRZ's provide efficient pooling of spatial resources within which a substantial portion of escape routes extend, on routing layers 16 (FIG. 3B). The intersection of an MRZ with a reference plane 11 within a dielectric layer 18 corresponds to a "routability zone" like 160Z' (FIG. 12C) between the terminals of a pattern. A routability zone a is contiguous channel positioned between a successive pair of groups in a terminal pattern. It extends continuously from the center 6 to the (outer) perimeter 10 of the pattern. It has a width generally defined by the spacing between several nearest-pairings of terminals of the two groups (such as 161,167 and 162,168 and 163,169 of FIG. 12B). It is bounded by a right boundary RB and a left boundary LB each tangent to several terminals—zone 160Z's "bounding terminals" of groups 160L and 160U, respectively. It can be designed to maintain the width of the nearest such pairing, narrowing where necessary to clear a bottleneck such as that between 161 and 167. It does not split to pass on both sides of any terminal in the pattern, nor does it overlap any signal-carrying terminal in the pattern.

The technical definition of an MRZ, then, is a three-dimensional portion of an interface having a cross-section qualifying as a routability zone as described and claimed herein. The width of a routability zone may optionally vary by less than 25% over a contiguous half of the zone's length. More preferably, the width increases substantially monotonically traversing outward across the outermost third of the zone, or inward across the innermost third of the zone.

A pattern of vias 14 (FIG. 3A) is simplest to describe by selecting a reference plane 11 through a dielectric layer 18 (FIG. 3B). The present invention also improves signal routability, however, when implemented on a pattern of bond pads 12 (FIG. 3C). Bond pads 12, as FIG. 3B plainly shows, are usually only accessible on a reference plane 10 that also passes through a pattern of vias 14. Reference plane 10 would thus pass through two distinct but overlapping patterns of terminals. Each of the pads 12 of FIG. 3C, for example, is arranged for routing conductive lines upward from the mount side reference plane 10, and each of the vias 14 is arranged for routing conductive lines downward.

Figure 12C:
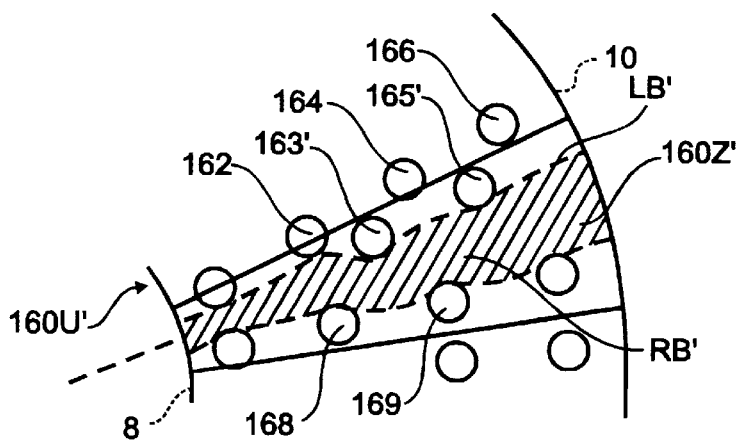
FIG. 12C depicts the same portion, but repositioning two terminals to widen the zone.

FIG. 12C depicts a portion of a terminal pattern having outward routability over that of FIGS. 12A and 12B. Two terminals 163',165' are repositioned so that they are interleaved among terminals 162,164,166. A terminal is "interleaved" with other terminals in its group if its nearest point on the group's reference segment is between that of two other terminals in its group. It is preferable that several terminals in the group (at least 2–10) that do not bound a zone are interleaved with a given set of bounding terminals.

By this repositioning, there are now four terminals 162, 163',164,165' in group 160U' that meet the above criterion. Zone 160Z' is more than twice as wide as 160Z over its outer half (the portion closer to 10 than 8), substantially improving outward routability. Note that a larger group desirably has much larger routability zones, resulting in at least 3–20 terminals that meet this criterion. The five outer terminals of group 160U' are "alternatively staggered" along the group's reference segment—i.e., each terminal successively farther along the reference segment is on the opposite side of the reference segment from its predecessor.

Note that the boundary RB' bulges on both sides of bounding terminal 169 of the right group. One of skill in the art will recognize the appropriateness of zone 160Z' bulging in this way, widening the zone to facilitate more routing along an arcuate path equidistant from terminal 165'. The left boundary LB' likewise bulges on both sides of bounding terminal 165', preferably following a (wavy) path extending generally outward from the center 6.

FIG. 13A schematically depicts several diagonally-offset via fanouts 13 comprising vias 12 and pads 14 (like that of FIGS. 3A & B) forming part of a radial interface. FIG. 13B depicts the portion of the via fanouts 13 of FIG. 13A that are in the radial pattern of vias 12. The planar pattern of vias 12 is available on several layers of a carrier, but the pattern of bond pads 14 is typically only available on a mount side reference plane 10 (FIG. 3B).

Figure 14:
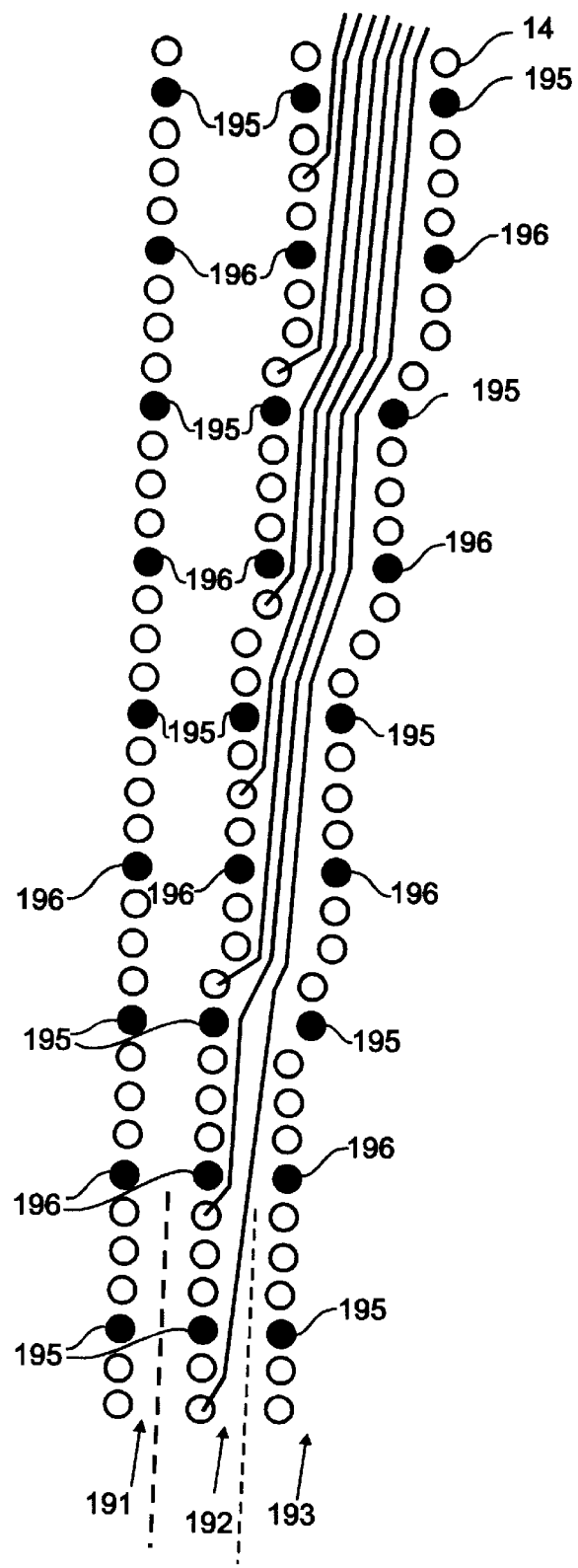
FIG. 14 shows a portion of a pattern of vias comprising three terminal groups, showing routing in one channel on one layer.

FIG. 14 shows a portion of a pattern of vias 14 comprising three terminal groups 191,192,193. Power terminals 195 and ground terminals 196 are interspersed among the terminals of each group 191,192,193. One out of four terminals in group 192 is routed generally outward through the routing zone between terminals groups 192 and 193. This terminal design would presumably necessitate at least four signal routing layers to provide escape routes for all of these signals, in addition to any layers required for power, ground, and shielding. Note that power terminals 195 and ground terminals 196 need not extend into routing layers, and may be positioned in the channels between the groups 191, 192, 193.

Figure 15:
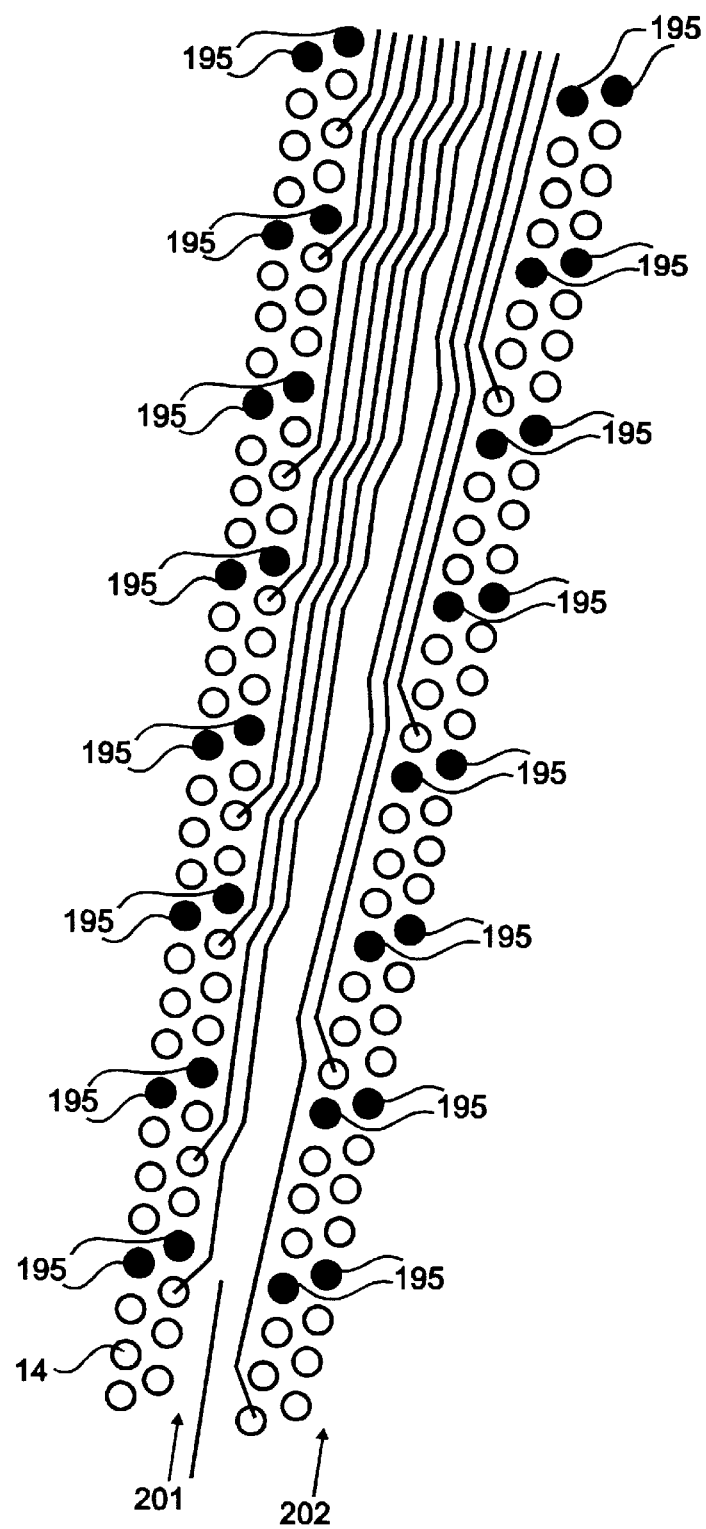
FIG. 15 depicts successive groups of densely, uniformly staggered vias in a radial pattern, 48 signal terminals per group.

FIG. 15 depicts successive groups 201, 202 of densely, uniformly staggered vias 14 in a radial pattern, 48 signal terminals per group. As depicted, 24 terminals from each group would be routed in the zone between groups 201 and 202. 12 of the 48 signals are routed on the layer shown in FIG. 15. If one fourth of these 48 are routed on each signal layer, four signal layers will be required. Sixteen ground terminals 195 are interspersed among and near the terminals of each group. a comparable number of power terminals 196 might occupy much of the carrier's mount side, or much of the pattern's center region. Even on the routing layer shown in FIG. 15, the "inner" area near the bottom has extra space.

Figure 16:
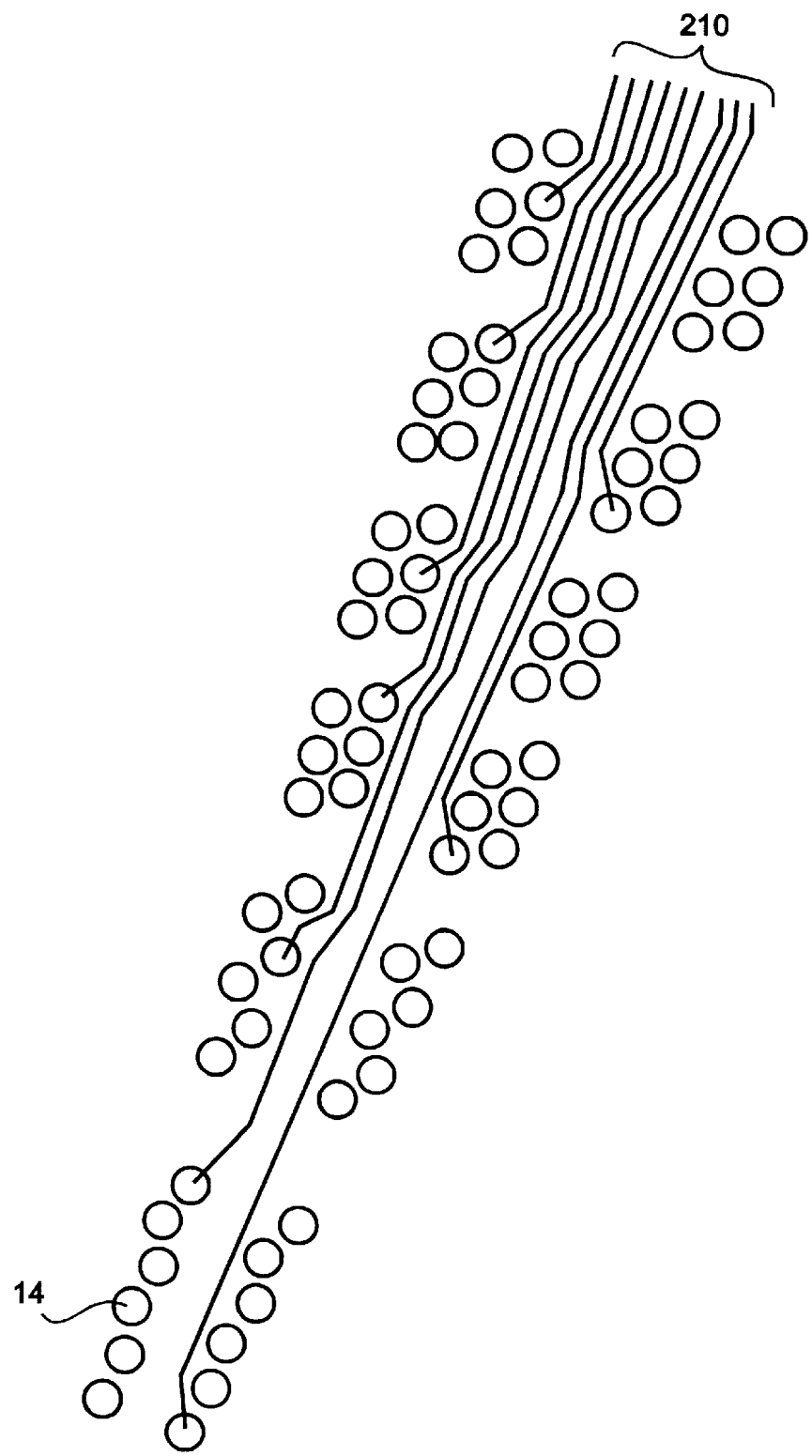
FIG. 16 shows a portion of a routing layer of an interface with 36 signal terminals per group.

FIG. 16 shows a portion of a routing layer of an interface with 36 signal terminals per group. As with FIGS. 14 and 15, routes 210 are depicted as very narrow curvilinear segments uniformly separated from each other and nearby terminals 14, a common schematic convention. More typically, actual routes have a dielectric zone about as wide as the route width.

Figure 17:
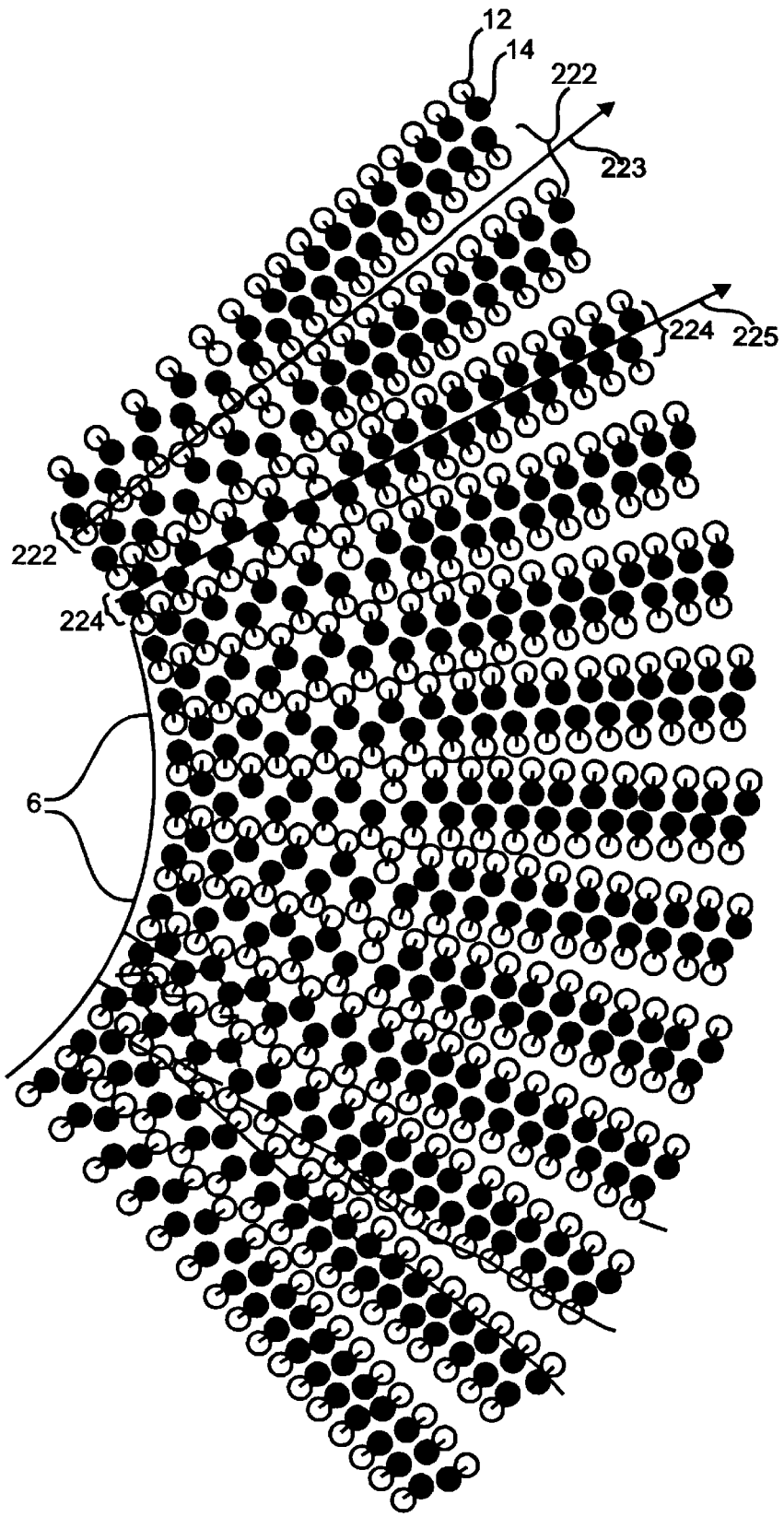
FIG. 17 depicts the mount side of a PCB showing repeated groupings of vias like those of FIG. 21 with an overlayed pattern of terminal pads.

FIG. 17 depicts one quadrant of two overlapping terminal patterns according to the current invention. Hollow circles 12 represent bond pads and solid circles 14 represent vias. Thirty-two terminals are arranged in group 222 clustered along a reference segment corresponding with a portion of radial ray 223. The offset of a radial splayed staggered terminal group like 222 from a radial ray like 223 alternates in direction and increases monotonically in magnitude as a function of distance from the center 6 of the pattern.

Thirty-two vias are arranged in terminal group 224 staggered along a reference segment corresponding with a portion of radial ray 225. The magnitude of the offset of terminal group 224 from its simple reference segment (along 225) increases substantially monotonically with distance from the center 6. A "simple" or "low order" contour is an ellipse, a line, a parabola, or other first- or second-order contour or segments thereof. Reference segments need not be simple: they can be spirals, third-order polynomials, and segments and continuous composites thereof.

To facilitate inward routing in patterns using reference segments of low-order contours, it is preferable that the innermost (or lowest-ranking) third of the terminals in the group have a lower average segment offset than the other terminals in the group. The innermost 11 terminals of group 222 are have an average reference segment offset from 223 less than half of the average offset magnitude of the rest of the terminals in group 222. It is also preferred for such patterns that this innermost third have a higher difference between successively-ranked terminals than that of the rest of the group—i.e., a greater dispersion in the outward direction. Near the center 6, note that the channel between groups 222 of bond pads 12 is larger than the channel between groups 224 of vias 14. For IC chip interfaces, inward routing is generally done on the substrate, and therefore favors such wider channels between such bond pad groups 222 near the center.

Figure 18:
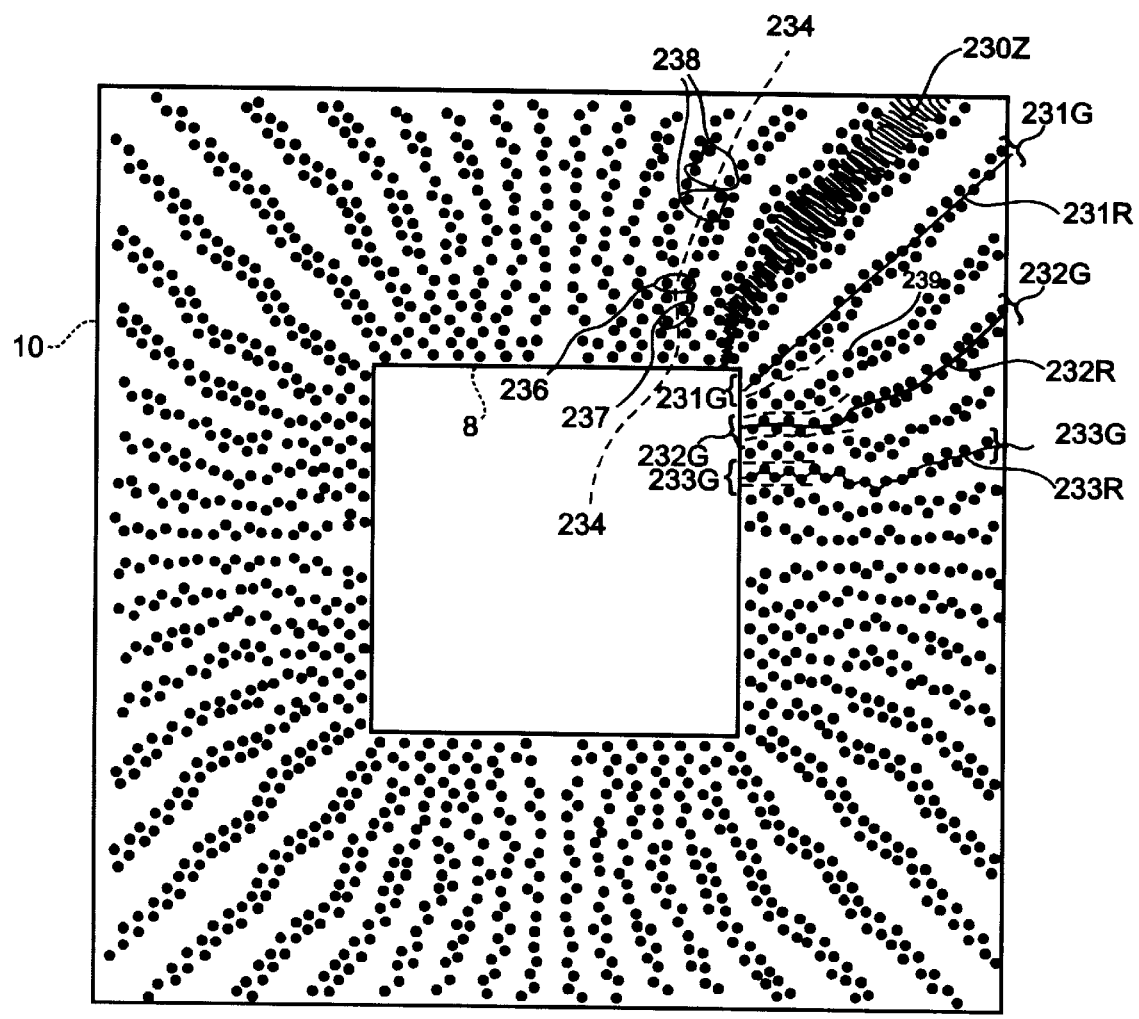
FIG. 18 depicts a complete terminal pattern according to the present invention, corresponding with the reference segment layout of FIG. 12B.

FIG. 18 depicts a complete terminal pattern according to the present invention, corresponding with the reference segment layout of FIG. 11B. The image of FIG. 18 can be projected directly or as a negative image onto masks by those skilled in the art to replicate the depicted pattern in a manufacturing flow. Three differently-configured reference segments 231R,232R,233R correspond respectively with three compatible terminal groups 231G,232G,233G. A separator segment 234 separates two other groups to illustrate pairings useful for determining the position of routability zones 230Z. In a simple inter-group pairing such as 236, the terminals are closer to one another than either is to any other terminal outside its respective group, and the two are situated roughly across from one another. The space between such pairings defines the width of a routability zone. In an offset inter-group pairing such as 237, the terminals are closer to one another than either is to any terminal outside its respective group, but the two are offset from another so much that the routability zone between them is narrower than the gap between them. This limitation is a function of applicable spacing rules as are known in the art. Where one terminal is equidistant from two nearest terminals in the other group (such as 3-terminal sets 238), the routability zone curves about the terminal, the boundary of the routability zone forming an arc between the two nearest terminals at a uniform distance from the terminal. Each routability zone may have several such bulges along its boundary in a staggered-pin pattern.

Terminals are desirably clustered along their respective reference segment according to a scheme that takes into account the shape of the nearest routability zone. For DRC purposes, a terminal protrudes from its group if it belongs to a first group of a successive pair, and the second group contains a terminal at least 5–15% closer to the terminal than to the rest of the first group. The distance between a terminal and a group is the distance between the terminal and the nearest terminal of the group. Preferably, less than half of the routability zones of the pattern are bounded by a protruding terminal such as 239.

Figure 19:
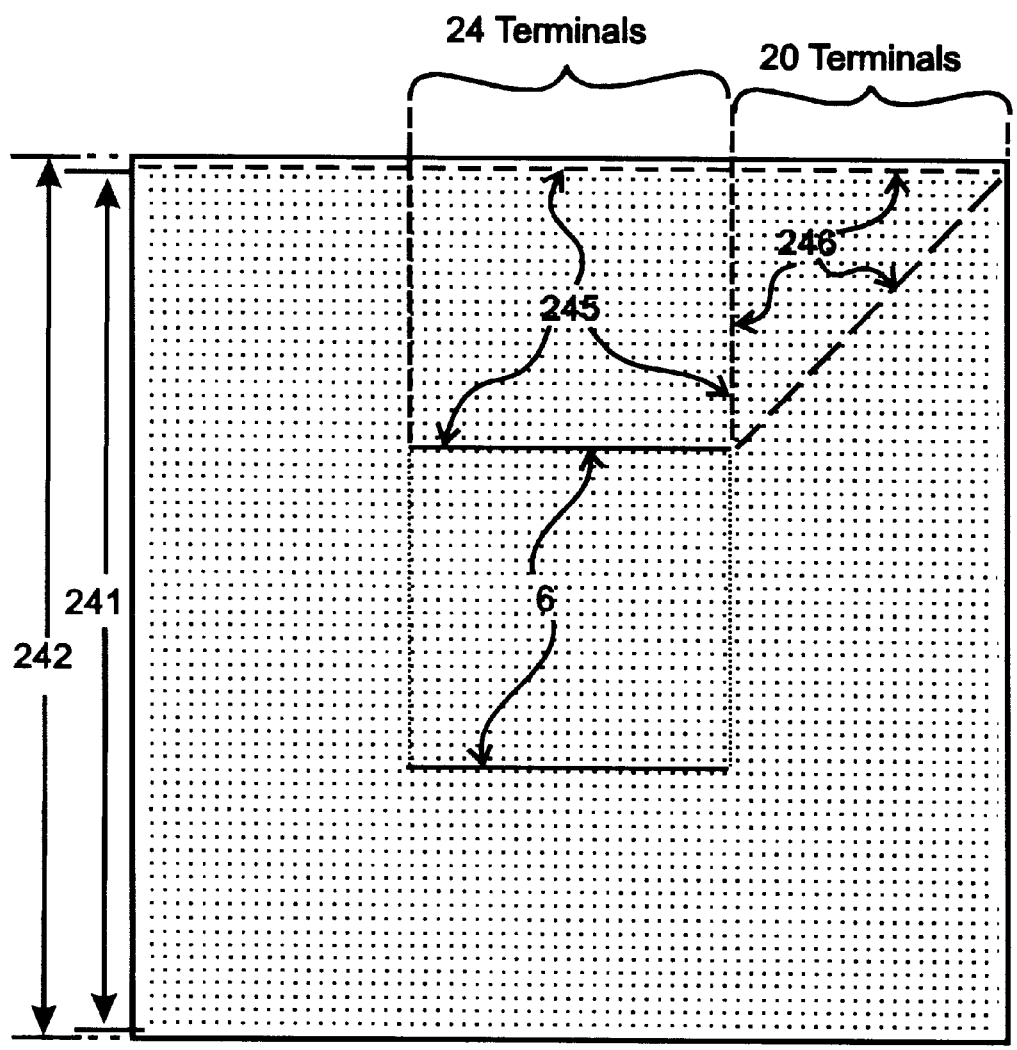
FIG. 19 shows a conventional 64×20 terminal pattern with 3520 terminals between the center and the perimeter.

FIG. 19 shows a square "64×20" terminal pattern known in the art. Center 6 contains 24×24=576 power and/or ground terminals. The package width 242 is 65×40 mils=2.6 inches, 40 mils greater than the pattern width 241. The outer 20 rows contain a total of 3520 terminals on a square grid.

For purposes of comparison, these terminals are assumed to be circular signal-carrying terminals with a 20-mil diameter on a 40-mil square grid. Each fourth circumferential row is presumed to comprise power or ground terminals, so that only 15 rows of signal-carrying terminals need routing. The terminal density is uniform, one terminal per 1600 square mils, or 625 terminals per square inch. The area of the pattern is 5.6 square inches. Two sets of Design Rules will be considered. In "3-mil Design Rules" calculations herein, each line is 3 mils wide and must be separated from adjacent lines and terminals by at least 3 mils. Under "4-mil Design Rules," each line is 4 mils wide and has a 4 mil clearance. From a routing standpoint, the worst-case position in this pattern is in zone 245. If this zone is routed straight upward, the innermost 14 rows of signal terminals must connect to escape routes passing among the 24 outermost terminals. Under 4-mil rules, two routes can escape between each adjacent pair of the outermost row, for a total of 48 routes (per routing layer). Because 14×24=336 upward escape routes are needed, 3361/48=7.0 routing layers are needed. The 3-mil rules also permit only two escape routes, because a third route would require 9 mils of conductor width plus 12 mils of clearance width, exceeding the inter-terminal gap width of 20 mils. Thus, this terminal pattern does not substantially benefit from a design rule relaxation from 4-mil rules to 3-mil rules. The "upward-routing model" method is conventionally used to calculate the number of routing layers needed. It should be noted, however, that terminals near the corner are easier to route (outwardly) because they taper to fewer rows needing escape routes in zone 246.

Figure 20:
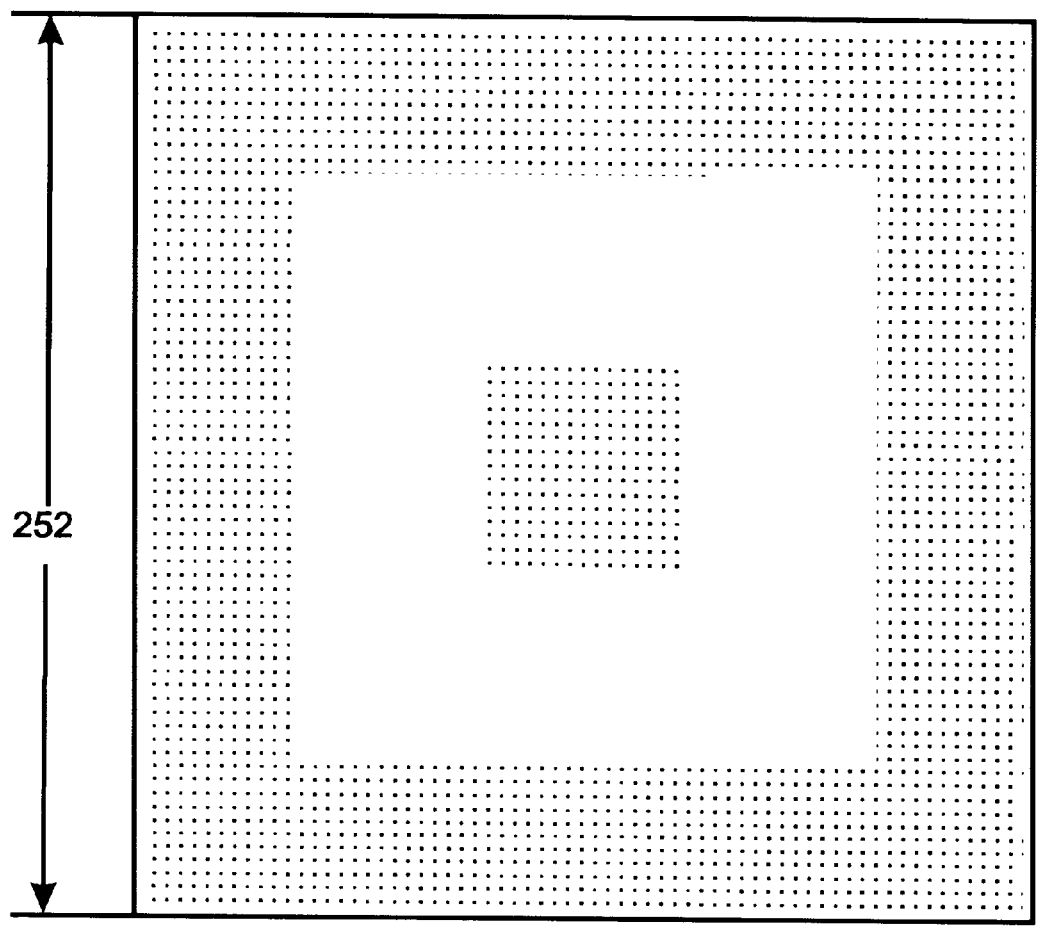
FIG. 20 shows a conventional 86×12 terminal pattern with 3520 terminals between the center and the perimeter.

FIG. 20 shows a square "86×12" terminal pattern known in the art. If each fourth row is not signal-carrying, this design can be routed in four layers. This calculation is the same with either 3 or 4-mil design rules. This would be a substantial improvement over the terminal design of FIG. 19, if not for the fact that the package width 252 increased to 3.48 inches.

Figure 21:
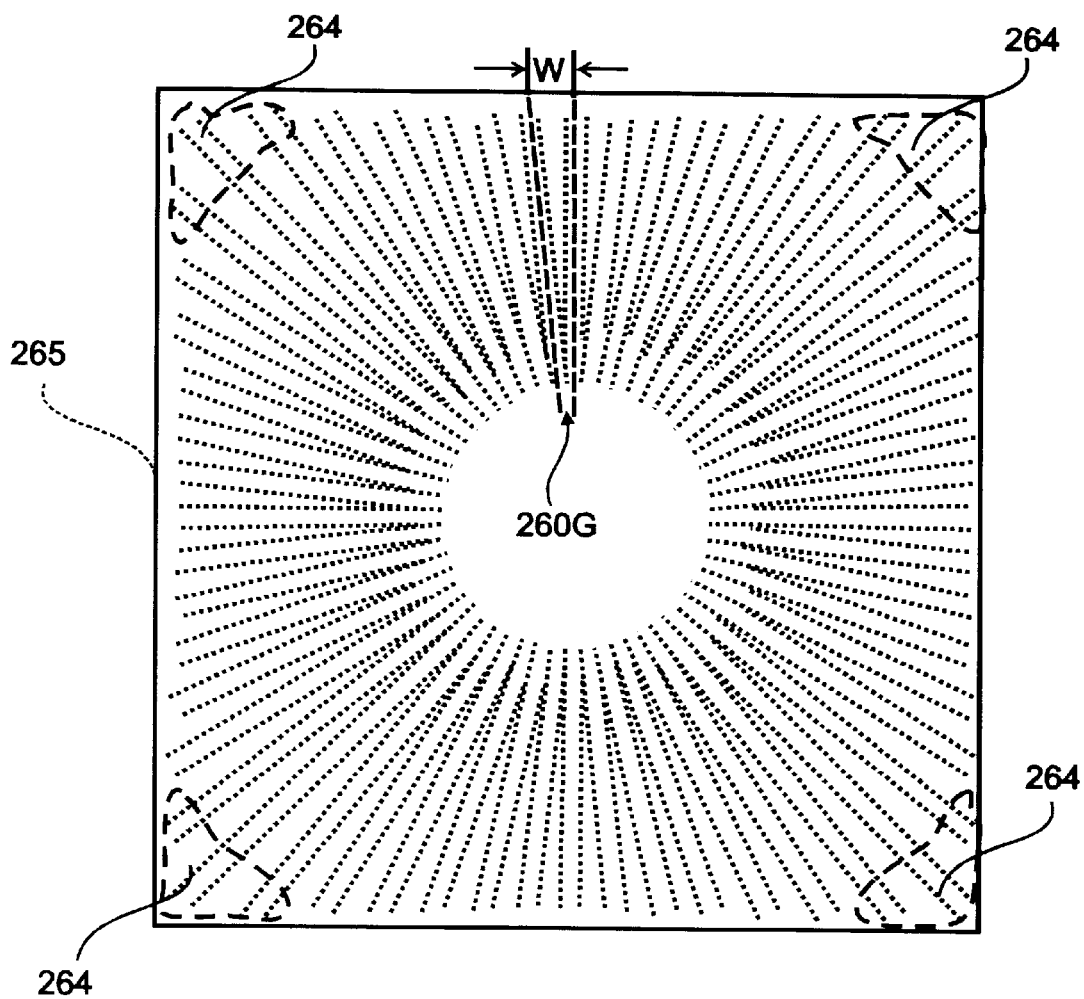
FIG. 21 shows a splayed staggered radial terminal pattern of the present invention with 3592 terminals between the center and the perimeter.

FIG. 21 shows a splayed staggered radial-type terminal pattern of the present invention showing 3592 terminals. The package footprint 265 and terminal pattern of FIG. 21 is scaled so that the package is 2.5 inches wide, and the terminal pattern area (between the center and the perimeter) is 5.7 square inches. The average terminal density is thus 627 terminals per square inch across this surface. The width W fairly allocable to the outermost two terminals of group 260G at the outer periphery of the pattern is approximately 140 mils. Note that a comparable width for a peripheral area having to accommodate two terminals is only 80 mils for the designs of FIGS. 24 and 25. The larger mean inter-terminal spacing along the outermost terminals thus increases from 20 mils to 50 mils in this embodiment, a significant advantage for outward routability. A 50 mil inter-terminal spacing can accommodate 5 traces under 4-mil rules, or 7 traces under 3-mil rules. Thirteen power and ground terminals are interspersed among 40 signal-carrying terminals of group 260G. The interface of FIG. 26 thus requires at most 38/10=3.8≈4 routing layers under 4-mil rules, or 38/14= 2.7≈3 routing layers under 3-mil rules.

Terminal patterns of this invention may have a footprint in the shape of a circle, an octagon, a rectangle or a square. In specific embodiments, terminal patterns of the present invention optionally have a footprint in the shape of a circle, an octagon, or a rectangle or a square with rounded or otherwise truncated corners. The later shapes with rounded or truncated corners represent a somewhat favorable compromise between the automated-handling and space-utilization benefits of a fully dense square pattern and the inward-routability and shear-reduction benefits of a round footprint. A bond pad pattern of FIG. 21 may be improved, for example, by removing the 128 pads in the four marked corner groups 264.

Figure 22:
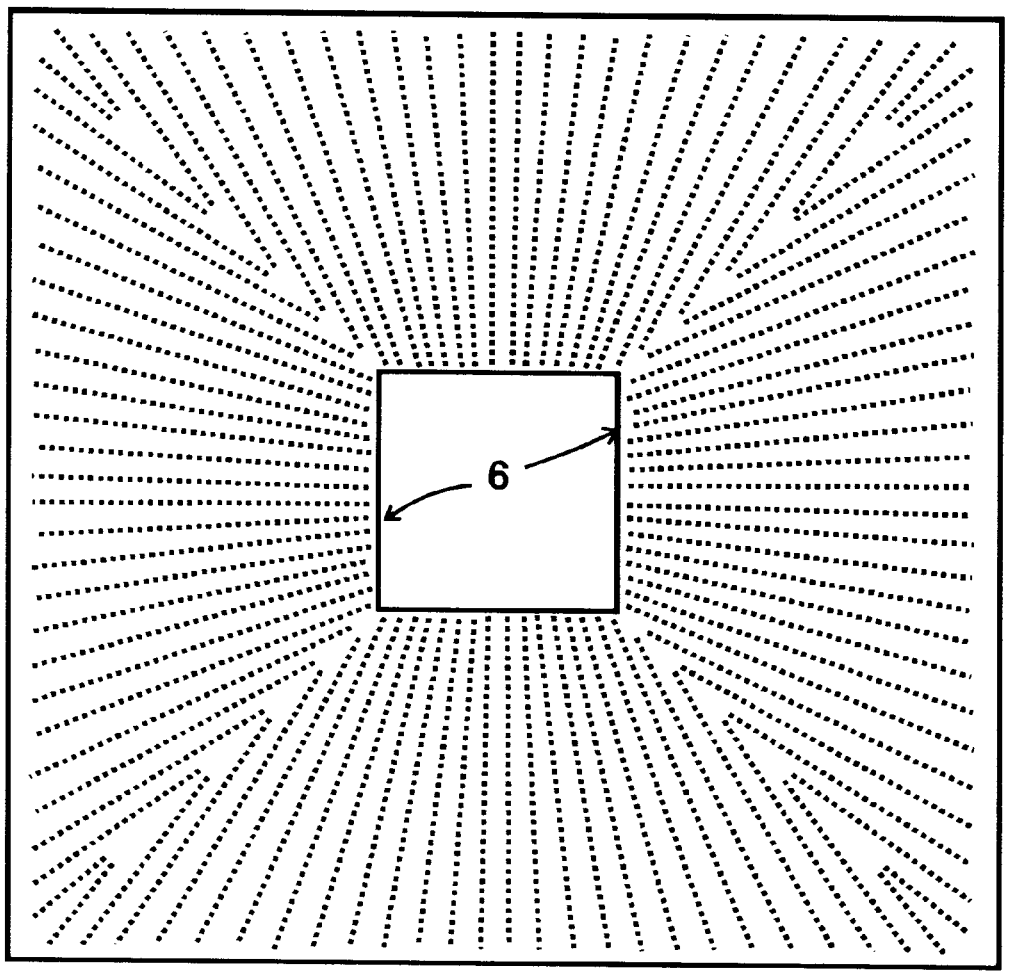
FIGS. 22 and 23 depict similar patterns of the present invention.
Figure 23:
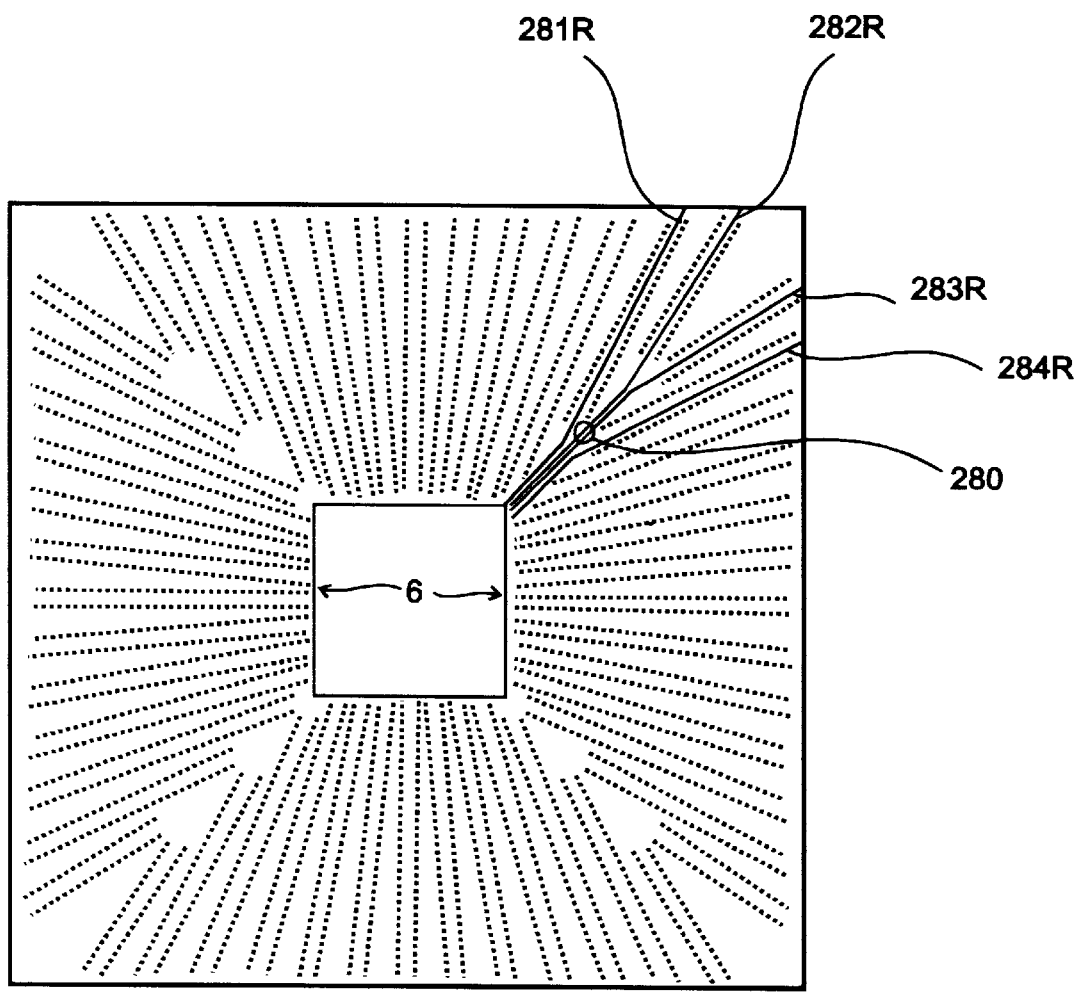

FIGS. 22 and 23 depict similar terminal layouts according to the present invention. Although the inner and outer perimeter (not shown) of these patterns would be somewhat irregular if viewed at high resolution, both depict a substantially square center 6. An area is "substantially" circular or square if it is possible to draw a similar, exactly circular or square shape having a width L that overlaps the outline and is nowhere more than 0.05 L from the outline. FIG. 23 illustrates a situation where two terminals 280 are derived from and more desirably associated with one pair of reference segments 281R,284R even though they are closer to other reference segments 282R,283R.

Figure 24:
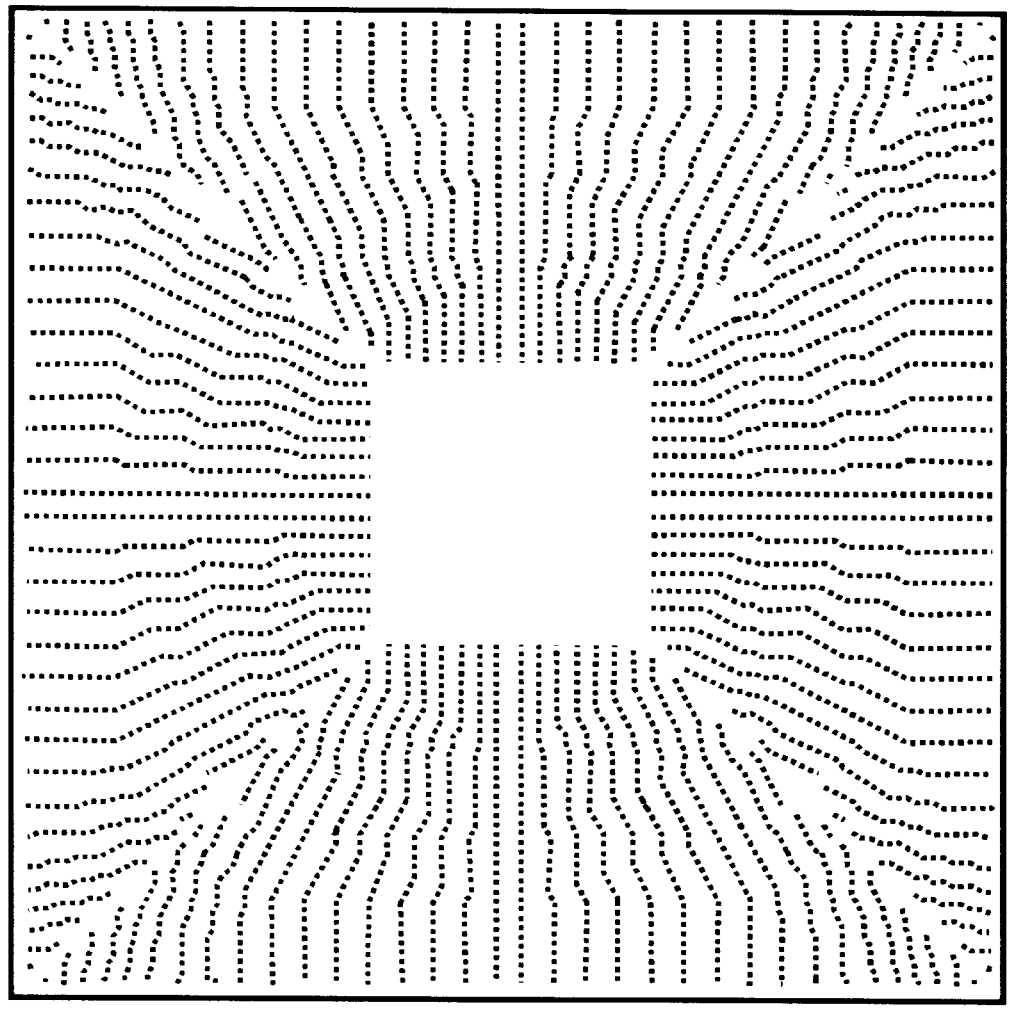
FIG. 24 depicts a "gridded" terminal pattern according to the present invention.

FIG. 24 depicts a "gridded" terminal pattern according to the present invention. Patterns of this type can be formed by "snapping" the pattern of FIG. 22 to a square grid or by other means known in the art. The "size" of a square grid is the length of one side of one square, the offset between two terminals on successive corners of a square of the grid. The size of the grid is preferably chosen to facilitate fixturing, such as for testing.

TABLE 1

Outward Routability Comparison

| | Terminal Count | Pkg Width (inches) | Rtg. Layers (4-mil rules) |
|---|---|---|---|
| Fig. 24 (prior art) | 3520 | 2.6 | 7 |
| Fig. 25 (prior art) | 3520 | 3.5 | 4 |
| Fig. 26 | 3592 | 2.5 | 4 |

Figure 25:
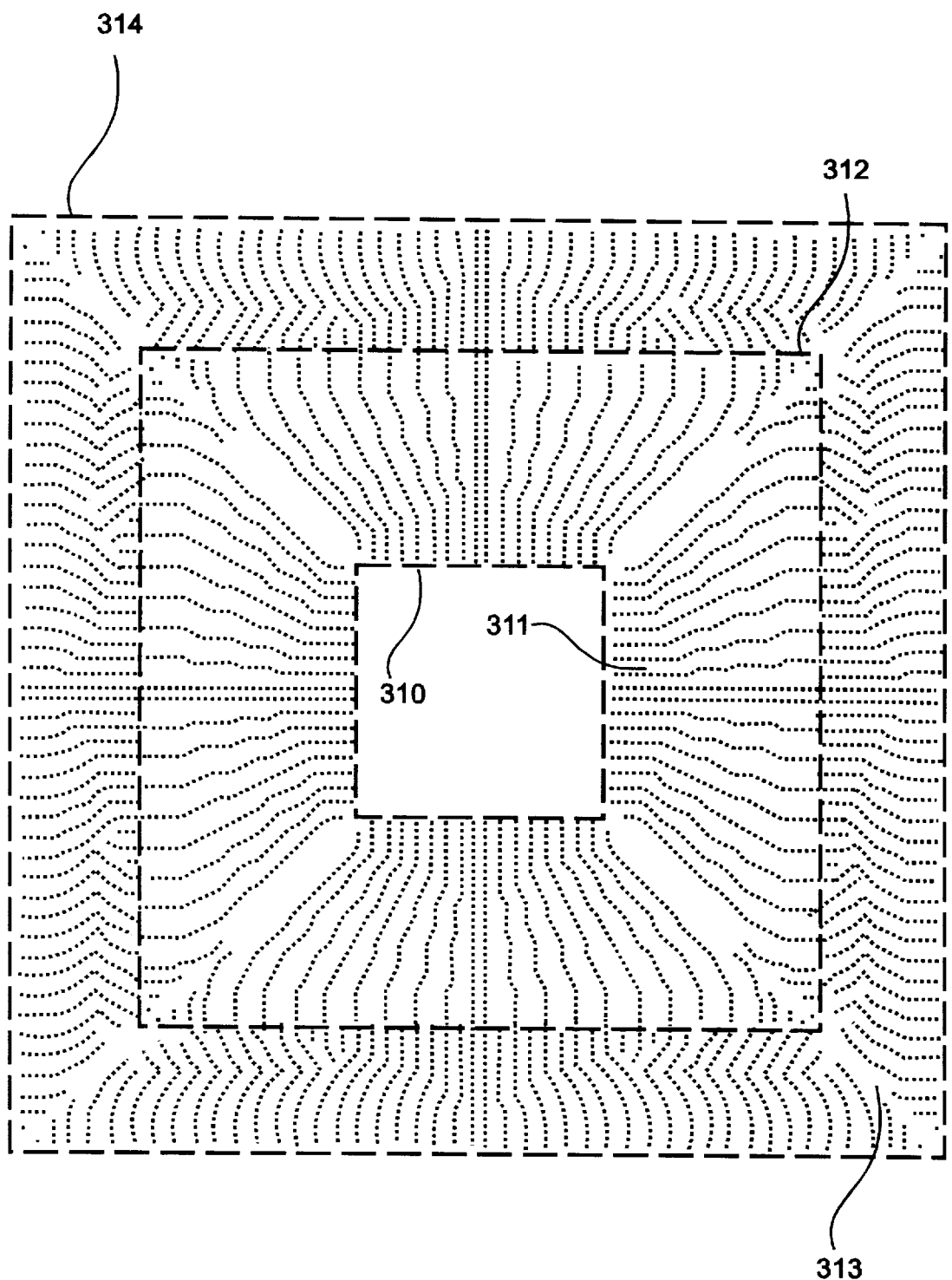
FIG. 25 depicts a composite of two patterns according to the present invention, one surrounding the other.

FIG. 25 depicts a composite of two instances of the present invention, one surrounding the other. Perimeter 310 bounds the inner pattern's center, and perimeter 312 is the (outer) perimeter of the inner pattern. The terminals of the inner pattern comprise signal terminals in the annular area 311 between these perimeters 310,312. Perimeter 312 also bounds the outer pattern's center, and perimeter 314 bounds the outer pattern. The terminals of the outer pattern comprise signal terminals in the annular area 313 between those perimeters 312,314.

A pattern of the present invention can be one of the component patterns in a compound pattern. A "compound pattern" contains two or more patterns (such as those of areas 311 and 313 of FIG. 25) having a distinct separation (such as 312) between their terminals. Suppose the inner pattern of FIG. 25 uses "through-hole via" terminals penetrating all five routing layers of a PCB, and the outer pattern use "blind via" terminals that penetrate only the top three routing layers. The inner pattern can benefit from the present invention by maximizing the degree to which the bottom two layers are used. Additional outward escape routes from the inner terminals (i.e., those in area 311) can necessitate a space-efficient terminal pattern for the outer terminals (i.e., those in area 313).

Figure 26:
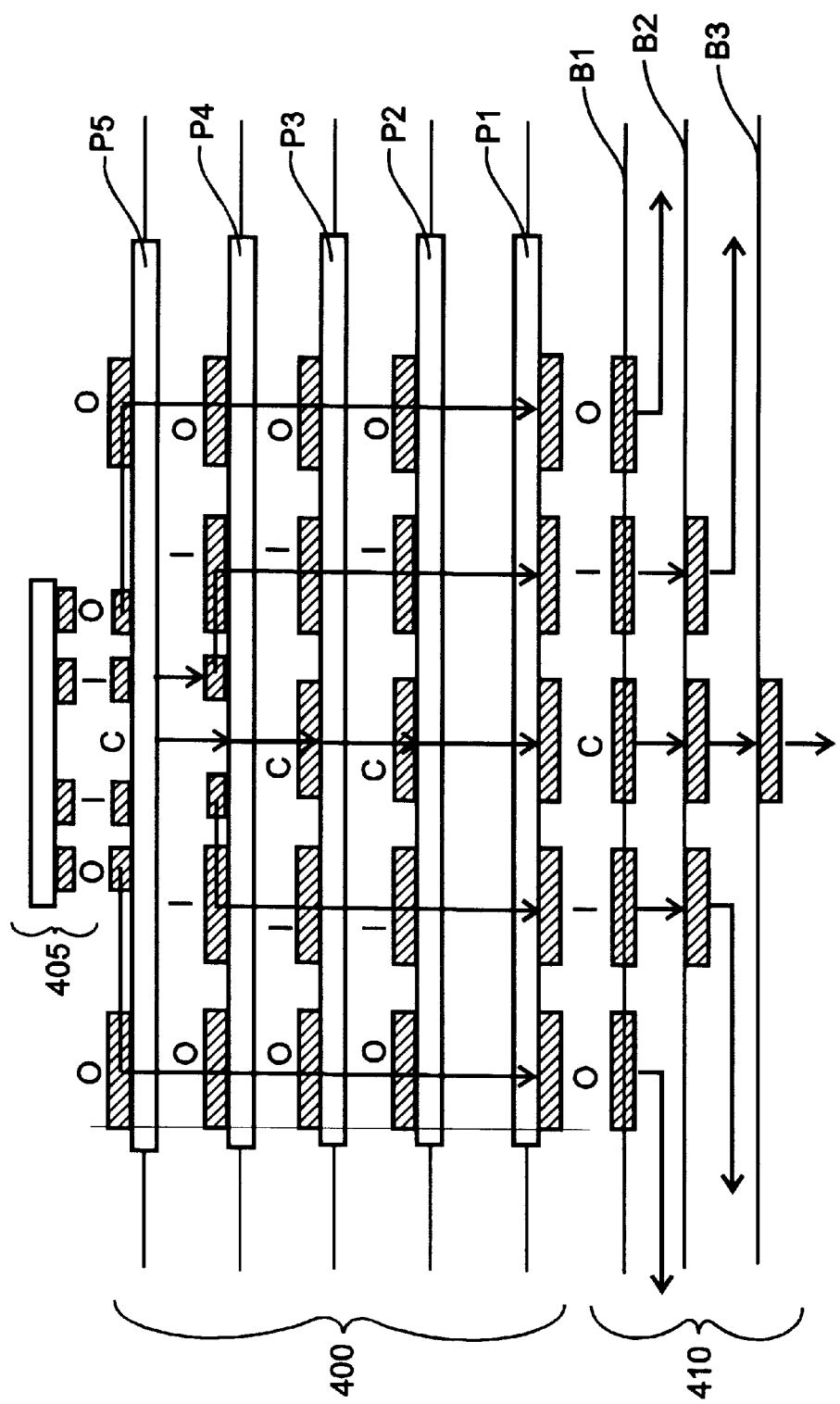
FIG. 26 is a schematic drawing (not to scale) of the layers of an IC package and PCB. A flip chip is mounted on the IC package.

The use of terminal patterns of this invention for flipchip bump pads and package ball pads, along with micro-via PCB technology, can reduce the number of layers required in an integrated circuit package substrate and in the PCB. FIG. 26 is a schematic drawing (not to scale) of a side view of an IC package (400), illustrated with a mounted flipchip (405). The package is itself mounted on a PCB (410). The illustrated IC package has five layers (P1–P5) and the PCB has three layers (B1–B3). Arrows indicate routing between layers and out of the PCB. Shaded rectangles indicate areas of terminal patterns of the various layers of the device which are illustrated in more detail in FIGS. 27A–D and discussed below. Outside (O), inside (I) and central (C) portions of terminal patterns on a layer are indicated in FIG. 26 and FIGS. 27A–D.

Figure 27A:
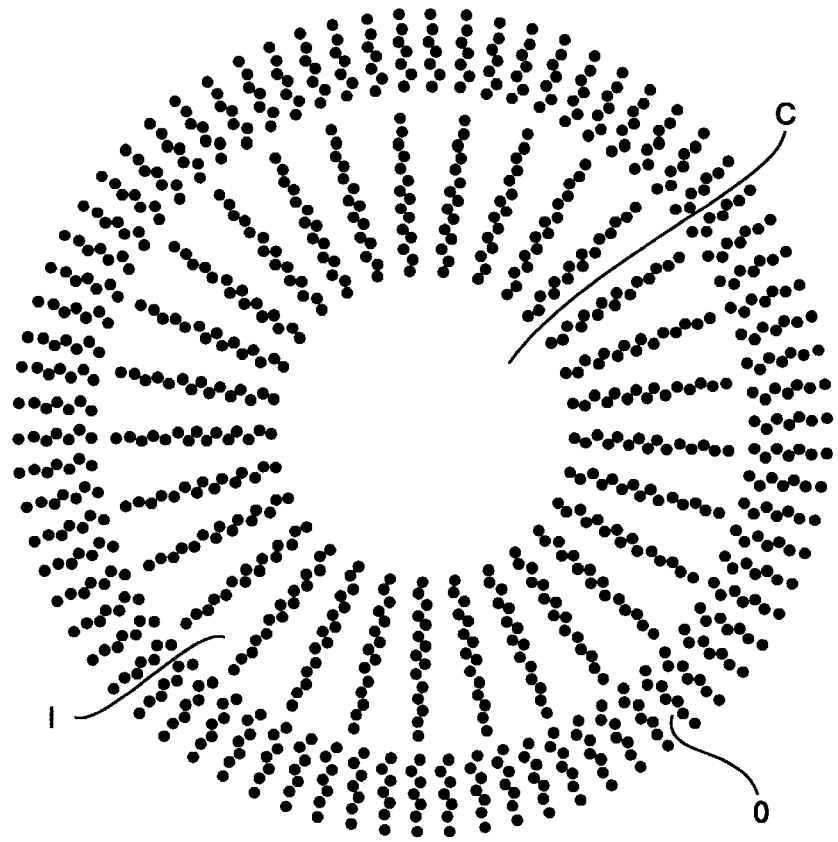
FIGS. 27A–D are illustrations of terminal patterns useful in various layers of the IC package, PCB and flip chip of FIG. 26.
Figure 27B:
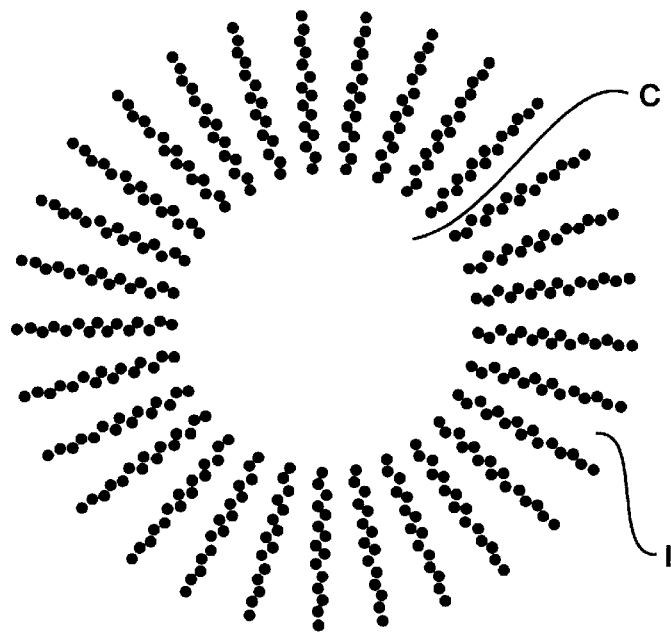

FIG. 27A illustrates a compound terminal pattern of this invention useful for layer P1 of the mounted IC package design of FIG. 26. The center of the pattern is labeled C in FIGS. 26 and 27A. The terminal pattern contains two different portions: an inside pattern (I) and an outside pattern (O). This same compound pattern is used for the bond pad pattern on layer B1 (top layer) of the PCB. The center (C) of the pattern would normally be filled with power and/or ground pins of the device. Also, power and/or ground pins would normally be distributed among the terminal pins in the inner and outer patterns. As indicated in FIG. 26, routing from B1 to other locations on the PCB can be accomplished on the first two micro-via layers of the PCB. Terminal pins in the outer pattern are routed on the top PCB layer B1. Vias to the second PCB layer (B2) are only required at the terminals of the inner pattern. FIG. 27B illustrates the via pattern of the B2 layer of the PCB. All connections to the terminals of the inner pattern can be made on the B2 layer. Vias to other layers (B3) of the PCB are only required for the power and ground pins.

Figure 27C:
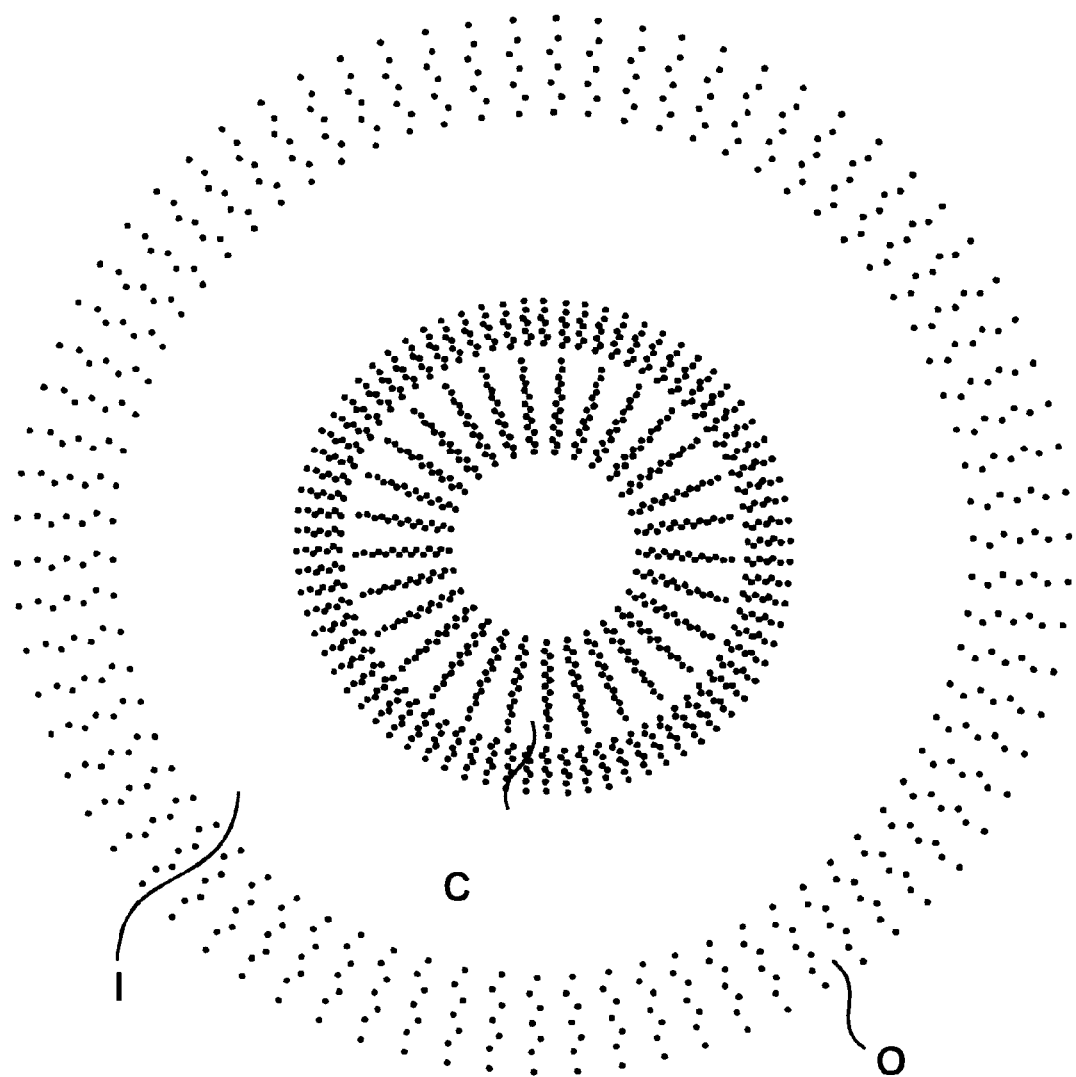
Figure 27D:
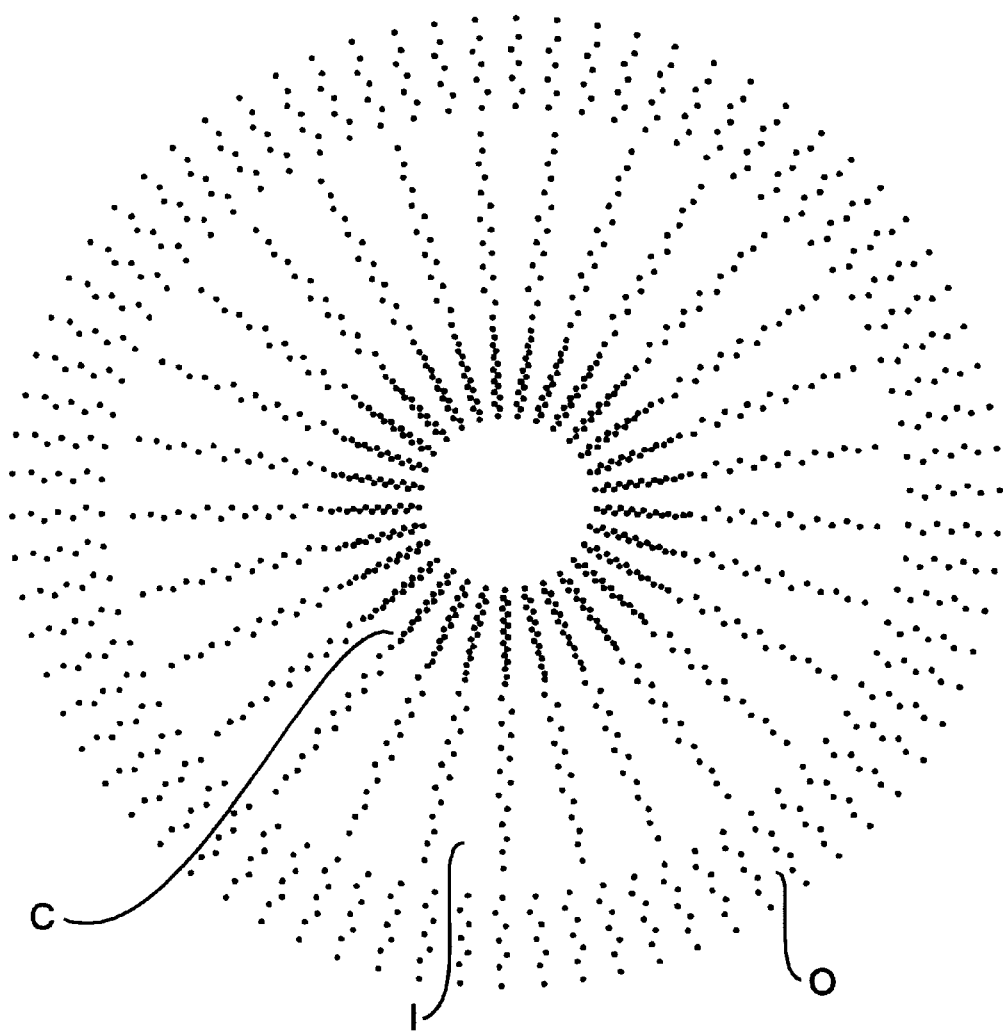

FIGS. 27C and 27D illustrate terminal patterns useful on layers P5 and P4–P2, respectively, of the IC package of FIG. 26. FIG. 27C illustrates the terminal pattern on the chip mount side (top layer, P5) of the IC package substrate. The central pattern C in FIG. 27C is similar to that of the interface between the package (P1) and the PCB (B1) (FIG. 27A). The central pattern C on FIG. 27D is similar to that of PCB layer B2. The terminal patterns of the IC package to PCB interface (P5–P1) are configured to support outward routing on the PCB and outward routing from the flipchip to the inward routing on the IC package to PCB interface. The terminal pattern of FIG. 27A is also used for the flip chip pump pads. Routing on the top layer (P5) of the package is from the outer pattern of the flip chip to the outer pattern of the package terminals. Vias to the P4 layer of the package substrate are required only for the inner flip chip pattern. Connections are made on the P4 layer to the inner portion of the package to PCB interface pattern. IC packages, flip chips and PCBs, as illustrated in FIG. 26, can be made by methods well known in the art.

If applicable Design Rules comprise a width $W_T$ for each terminal with its associated clearance, a width $W_L$ to each line with its associated clearance, a number of signal-carrying terminals $N_{sc}$ of the pattern, an outermost-row-shaped perimeter length $L_p$, a maximum number of pure-routing layers $N_{RL}>2$ (discounting to compensate for shielding layers or structures). A preferred embodiment of the present invention distributes a quantity of terminals on the outermost row $T_1$ that is within about 10% of the "maximum" defined as $(W_L N_{sc}-L_p N_{RL})/(W_L-W_T N_{RL})$. For example, if Design Rules were set as follows:

$W_L$=8 mils $W_T$=20 mils $N_{SC}$=3000 signal-carrying terminals $N_{RL}$=7 routing layers $L_p$=8000 mils The corresponding "maximum" calculates as 242.4, so the preferred embodiment has 219 to 242 terminals in its outermost row. The number of terminals on the next-outermost row $T_2$ can be determined iteratively by an incremental the $T_2$ terminals on the second-outermost row are neither randomly dispersed nor perfectly aligned with the $T_1$ terminals in the outermost row, but that each be offset by about $W_L$. The iterative reductions of $L_p$ are preferably non-uniform, so that terminal rows are distributed along concentric shapes separated by lanes having a nonuniform width. Note that this iterative calculation and approach also works for optimizing inward routability, working outward from the innermost row.

The foregoing examples are provided for illustrative purposes, and are not intended to limit the scope of the invention as claimed herein. Any variations in the exemplified articles which would occur to the skilled artisan from inventive teachings herein are within the scope and spirit of the present invention. Adding and/or removing terminals from patterns presented above and those known in the art to form groups and channels as described and claimed herein, for example, can result in significant benefits over existing interface designs.

Each reference cited in the present application is incorporated by reference herein to the extent consistent herewith. Any dedication to the public of novel ideas herein will be made expressly by separate instrument, and any contrary implication derived from this application is hostile to Applicant's intent.

What is claimed is:

1. A terminal pattern for an integrated circuit package having a center and an outer perimeter and comprising a plurality of groups of terminals each of said groups of terminals are substantially organized into a plurality of radial spokes extending from the center to said outer perimeter and forming a routability zone between each of said radial spokes wherein:

(a) the terminals in each of said groups of terminals are clustered along a reference line segment extending from the pattern center to intersect the device perimeter;

(b) at least about 90% of the terminals in a given terminal group are each closer to the reference line segment of that terminal group than they are to the reference line segment of another terminal group;

(c) the position of a terminal in a group is defined by its distance from the pattern center and its offset from the reference line segment;

(d) at least about 50% of the terminals in a group are not collinear with, but offset from, the reference line segment;

(e) in at least one of the terminal groups, either the offset of the terminals from the reference line segment is not uniform, or the distance of the terminals from the pattern center does not increase uniformly; and wherein each terminal in said pattern is sufficiently offset from each other terminal in said pattern consistent with Design Rules.

2. The terminal pattern of claim 1 wherein a portion of the terminals in a group are alternatively staggered along the reference line segment of the group.

3. The terminal pattern of claim 1 wherein in a group of terminals the magnitude of the offset of each terminal from the reference line segment of the group increases as the distance of the terminals in the group from the center of the pattern increases.

4. The terminal pattern of claim 1 wherein in a group of terminals the magnitude of the offset of each terminal from the reference line segment of the group increases then deceases as the distance of the terminals in the group from the center of the pattern increases.

5. The terminal pattern of claim 1 wherein at least about 50% of the routability zones in the pattern are generally wedge-shaped in an outward direction from the pattern center.

6. The terminal pattern of claim 1 wherein a plurality of terminals in the pattern fall on a grid.

7. The terminal pattern of claim 1 wherein all groups of terminals in the pattern have the same number of terminals.

8. The terminal pattern of claim 1 wherein the pattern has a footprint in the shape of a circle, an octagon, a rectangle, a square, or a rectangle or square with truncated corners.

9. The terminal pattern of claim 1 wherein the terminals are selected from the group consisting of vias, microvias, through-hole vias, blind vias, buried vias, staggered vias, bond pads, bump pads, bull pads and combinations thereof.

10. The terminal pattern of claim 1 that is formed on an integrated circuit flip chip.

11. A compound terminal pattern comprising one or more terminal patterns of claim 1.

12. The compound terminal pattern of claim 11 which comprises an inner radial pattern and an outer radial portion.

* * * * *

UNITED STATES PATENT AND TRADEMARK OFFICE
CERTIFICATE OF CORRECTION

PATENT NO. : 6,310,398 B1
DATED : October 30, 2001
INVENTOR(S) : Katz

It is certified that error appears in the above-identified patent and that said Letters Patent is hereby corrected as shown below:

Title page,
Item [57], ABSTRACT, please replace "via" with -- vias -- and "another" with -- other --.

Column 5,
Line 42, please replace "segments" with -- segment --.

Column 7,
Line 44, please replace "22" with -- 22 --.
Line 45, please replace "44" with -- 44 --.
Line 63, please insert -- lie -- between "terminals" and the final period in the line.

Column 9,
Line 23, please insert -- of -- between "None" and "the".

Column 10,
Line 7, please insert -- of -- between "side" and "reference".
Line 51, please replace "terminals" with -- terminal --.
Line 61, please replace "24" with -- 24 --.
Line 63, please replace "12" with -- 12 -- and "48" with -- 48 --.
Line 64, please replace "48" with -- 48 --.

Column 11,
Line 35, please replace "11" with -- 11 --.
Line 36, please delete "are" following "222".

Column 13,
Line 16, please replace "38/10=3.8≐4" with -- 38/10=3.8≐4 --.
Line 23, please replace "later" with -- latter --.

Column 14,
Line 12, please replace "use" with -- uses --.
Line 66, please replace "pump" with -- bump --.

UNITED STATES PATENT AND TRADEMARK OFFICE
CERTIFICATE OF CORRECTION

PATENT NO. : 6,310,398 B1
DATED : October 30, 2001
INVENTOR(S) : Katz

It is certified that error appears in the above-identified patent and that said Letters Patent is hereby corrected as shown below:

Column 15,
Line 29, after "incremental" please insert -- reduction of $L_p$ and $N_{sc}$. It is desirable that --.

Signed and Sealed this

Twenty-third Day of April, 2002

Attest:

Attesting Officer

JAMES E. ROGAN
Director of the United States Patent and Trademark Office